US008499901B2

(12) United States Patent
Jenkins

(10) Patent No.: US 8,499,901 B2
(45) Date of Patent: Aug. 6, 2013

(54) LINKAGE ASSEMBLY FOR DRILLING OR MOBILE WELL SERVICING RIG BRAKING SYSTEM

(75) Inventor: Vernon Raymond Jenkins, Humble, TX (US)

(73) Assignee: Nabors Well Services Ltd., Houston, TX (US)

( * ) Notice: Subject to any disclaimer, the term of this patent is extended or adjusted under 35 U.S.C. 154(b) by 326 days.

(21) Appl. No.: 12/972,017

(22) Filed: Dec. 17, 2010

(65) Prior Publication Data

US 2012/0152672 A1 Jun. 21, 2012

(51) Int. Cl.
*F16D 55/08* (2006.01)
(52) U.S. Cl.
USPC ............ 188/72.9; 188/318; 188/322.13
(58) Field of Classification Search
USPC ..... 188/72.6, 72.9, 110, 318, 322.13; 303/71; 166/377; 175/24; 254/267, 269
See application file for complete search history.

(56) References Cited

U.S. PATENT DOCUMENTS

| 2,658,589 | A | * | 11/1953 | Ashton | 188/151 R |
| 2,928,505 | A | * | 3/1960 | Hart | 188/77 R |
| 3,031,236 | A | * | 4/1962 | Driver | 303/71 |
| 3,685,288 | A | * | 8/1972 | Cordrey | 91/388 |
| 4,168,768 | A | * | 9/1979 | Johnson et al. | 188/204 A |
| 4,257,578 | A | * | 3/1981 | Allen | 254/298 |
| 7,513,338 | B2 | | 4/2009 | Newman | |
| 2003/0116012 | A1 | * | 6/2003 | Mickelson | 92/164 |

* cited by examiner

*Primary Examiner* — Christopher Schwartz
(74) *Attorney, Agent, or Firm* — Vinson & Elkins L.L.P.

(57) ABSTRACT

The present disclosure provides improved linkage assemblies for use with drilling rig and mobile well servicing rig braking systems, and braking systems comprising such improved linkage assemblies. The disclosed improved linkage braking assemblies effectively decouple the emergency brake actuation cylinder shaft and the brake lever upon activation of the emergency brake actuation cylinder, thereby preventing the brake lever from rapid and forceful downward movement, which could injure the operator.

20 Claims, 30 Drawing Sheets

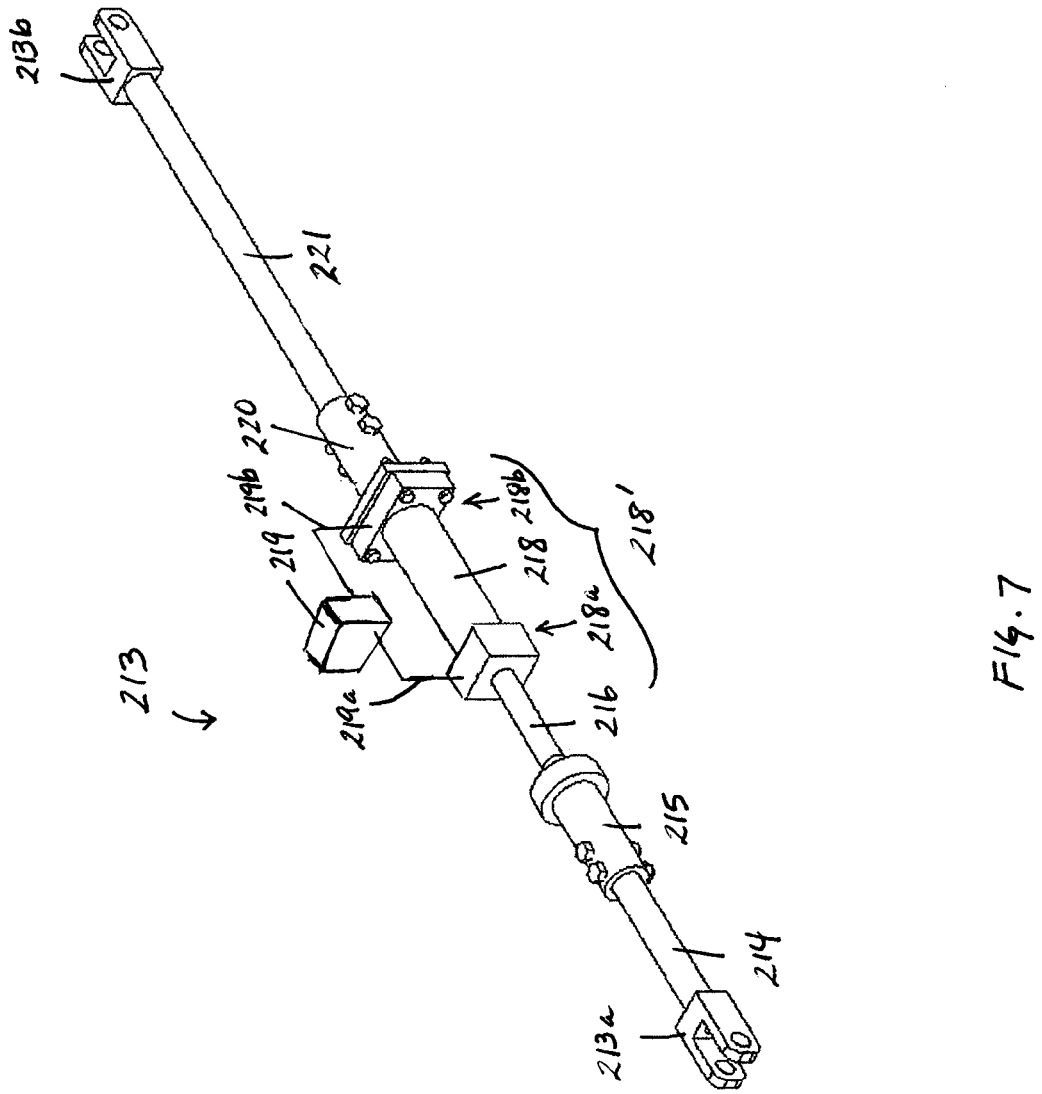

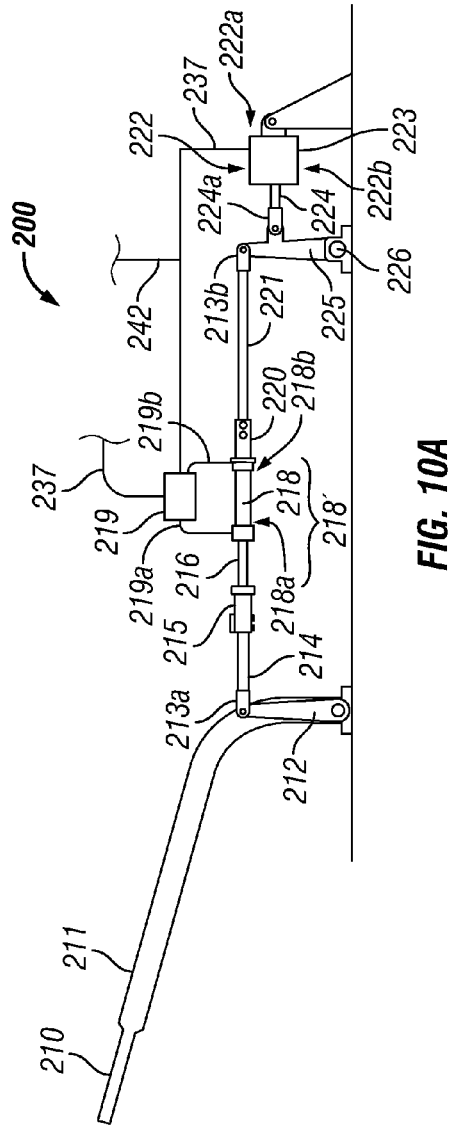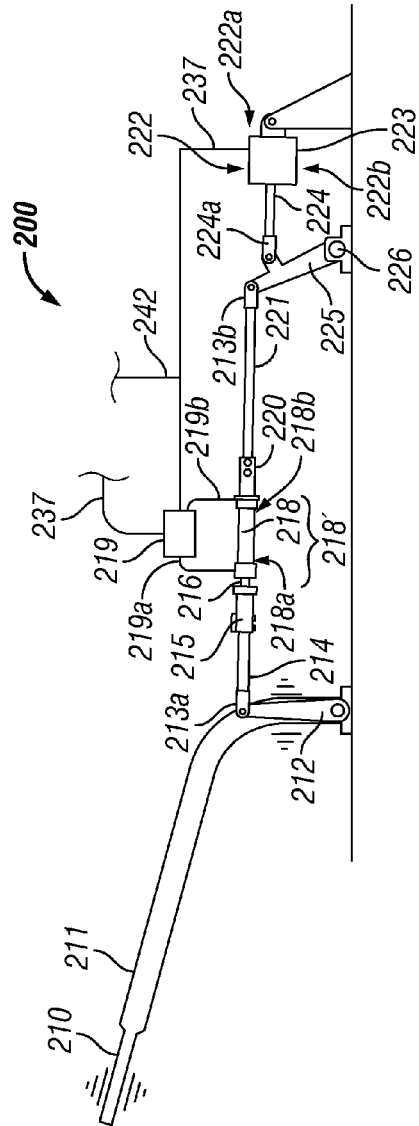

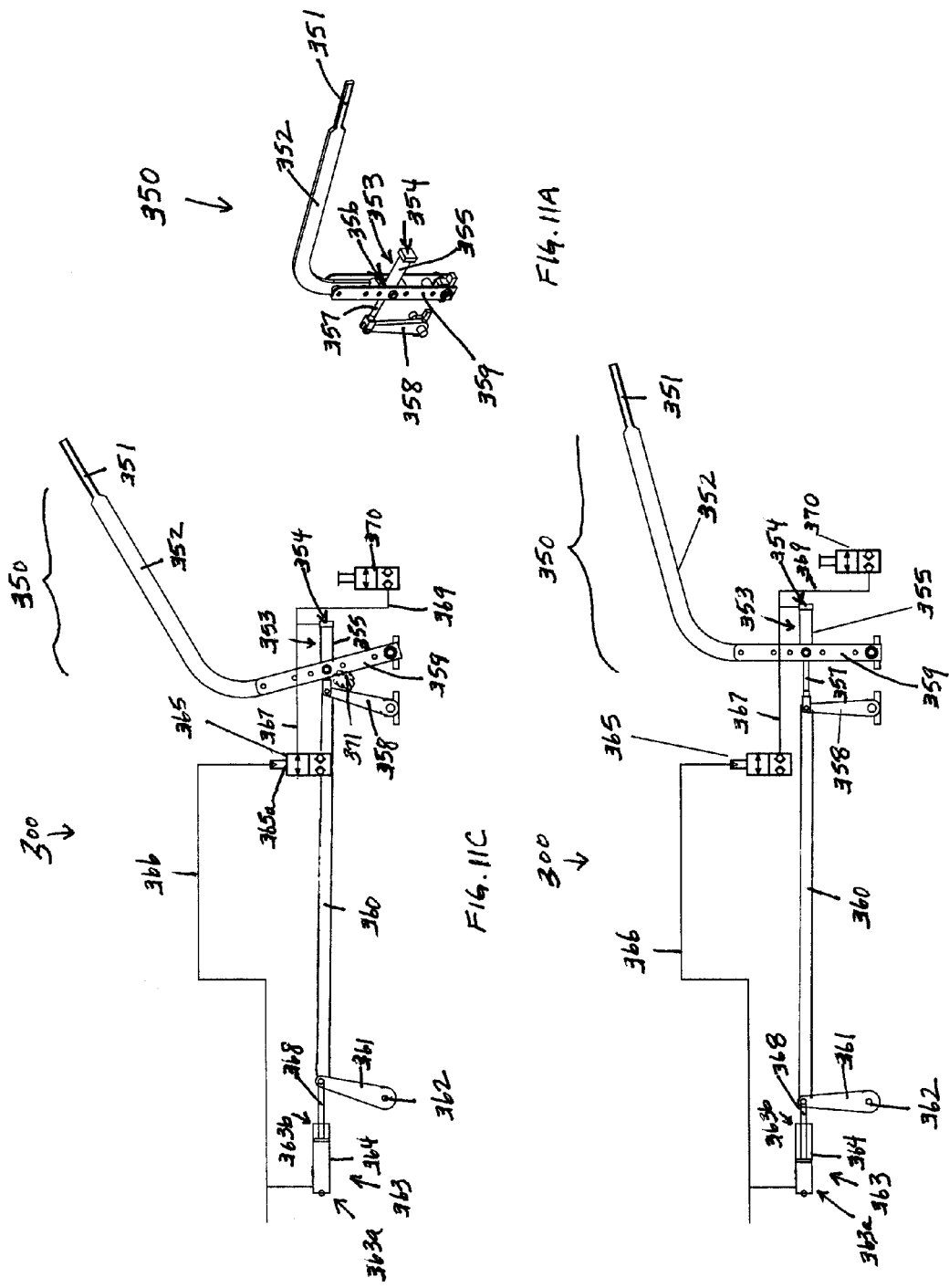

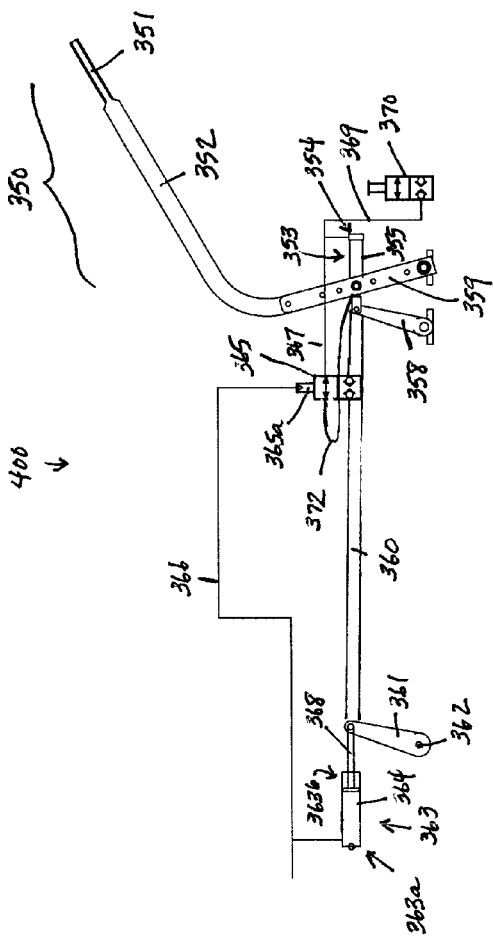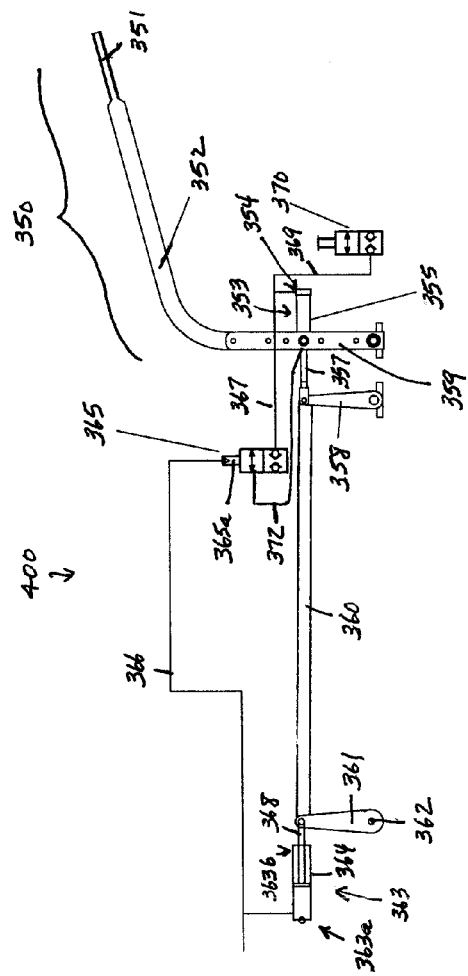

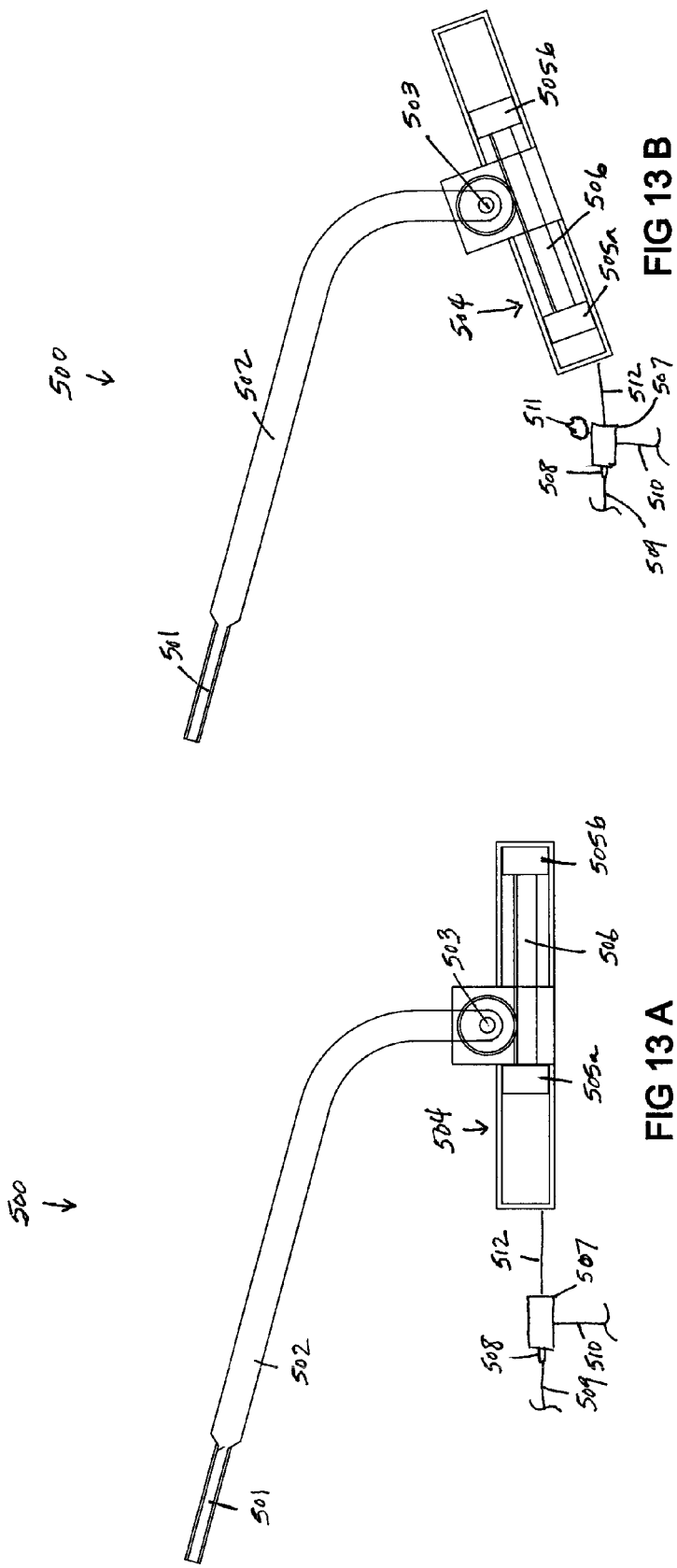

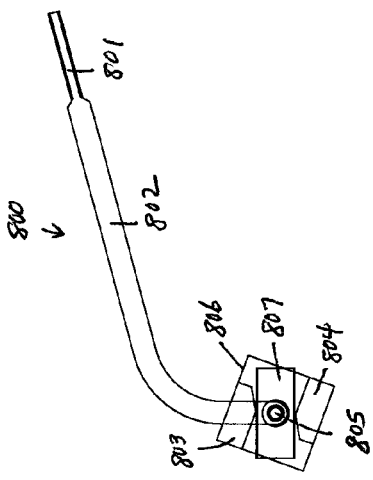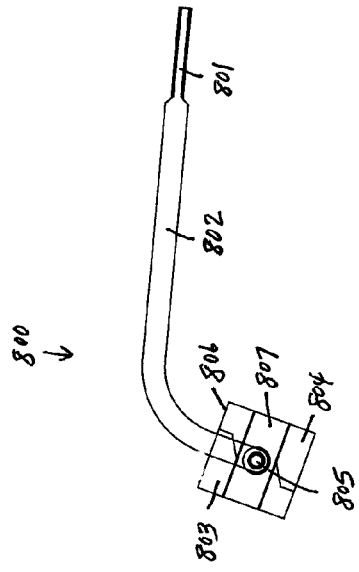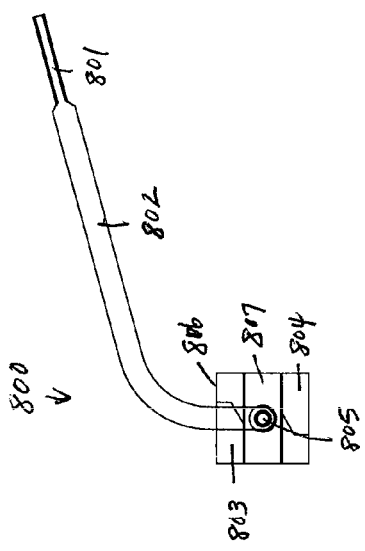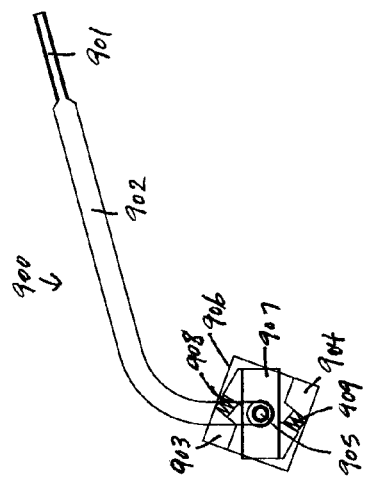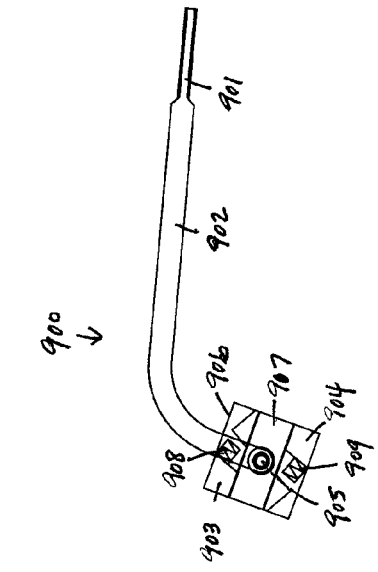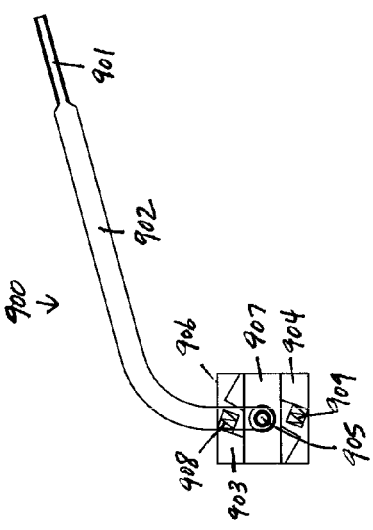

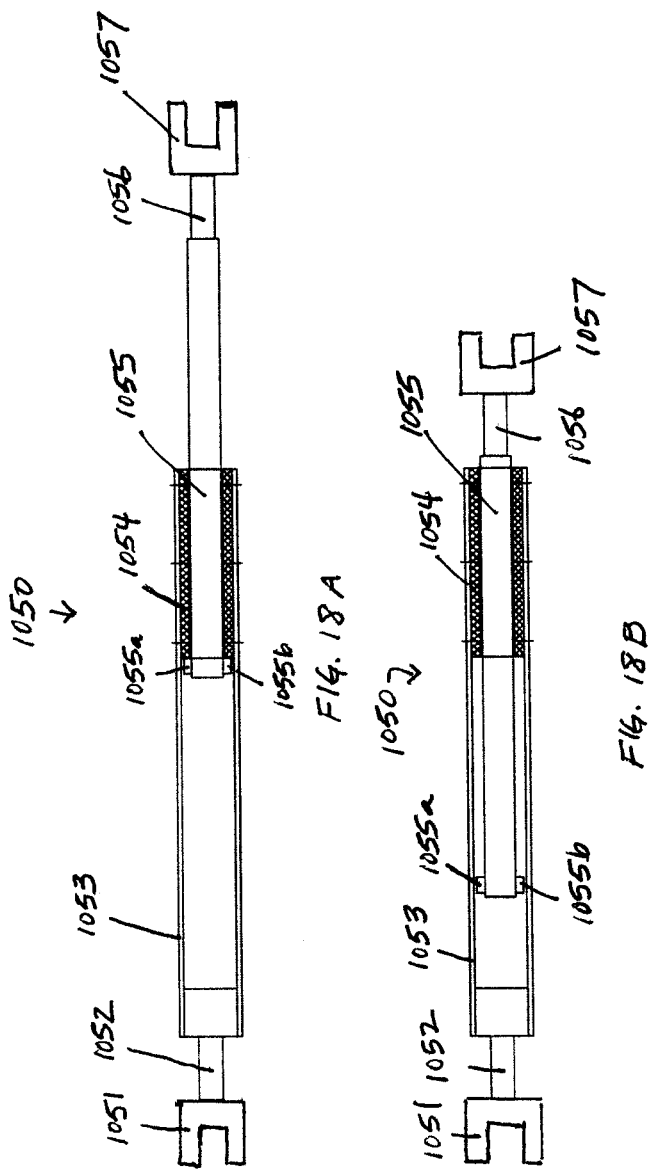

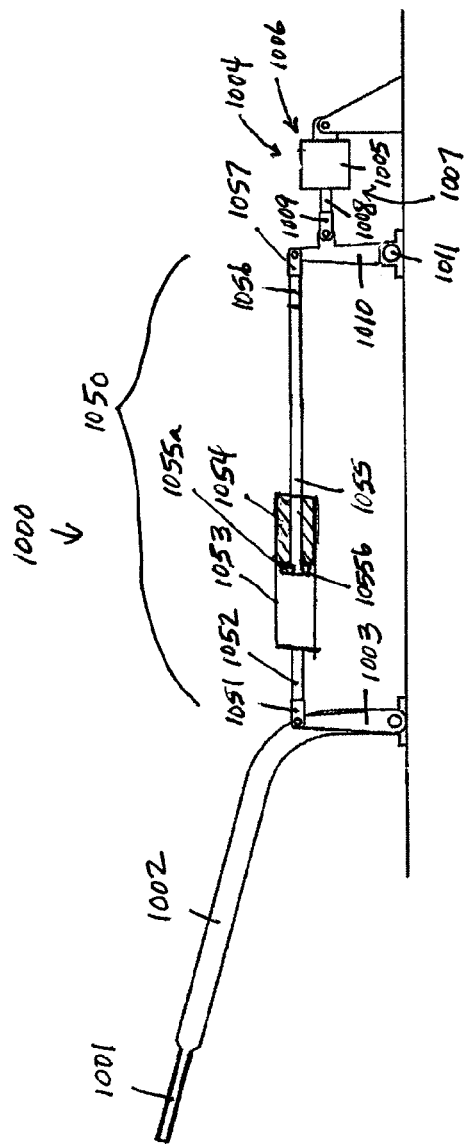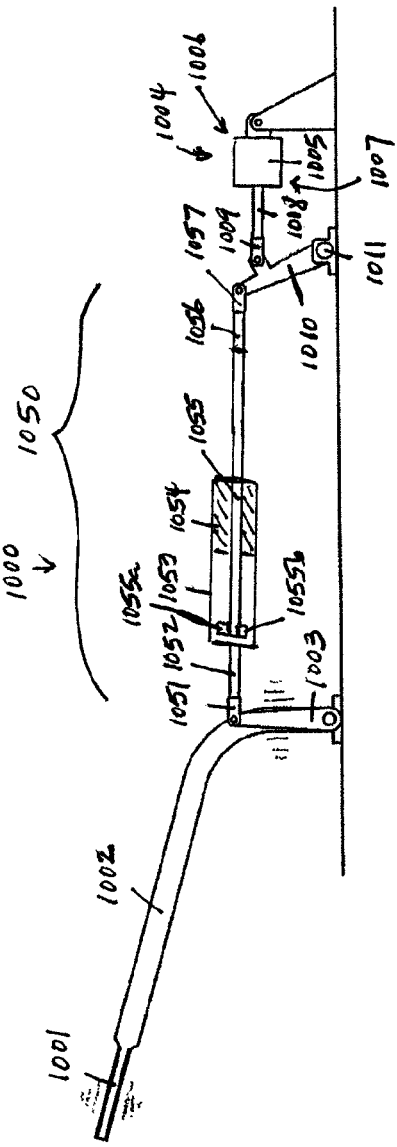

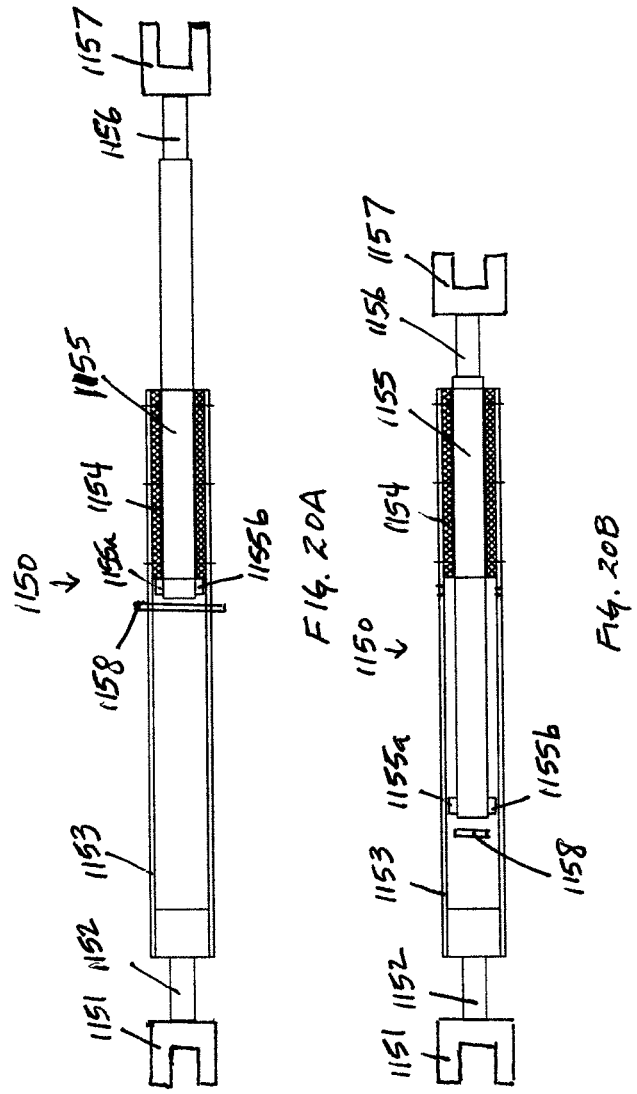

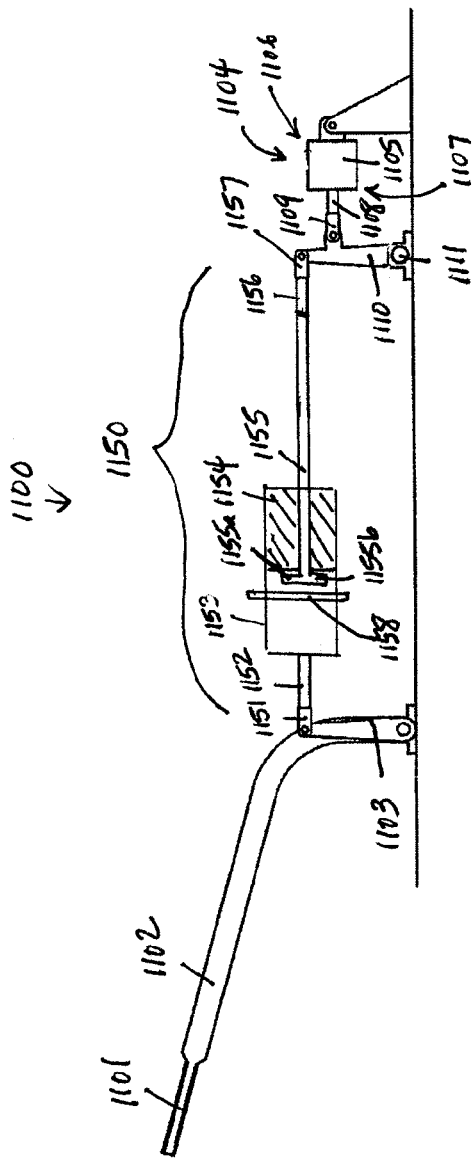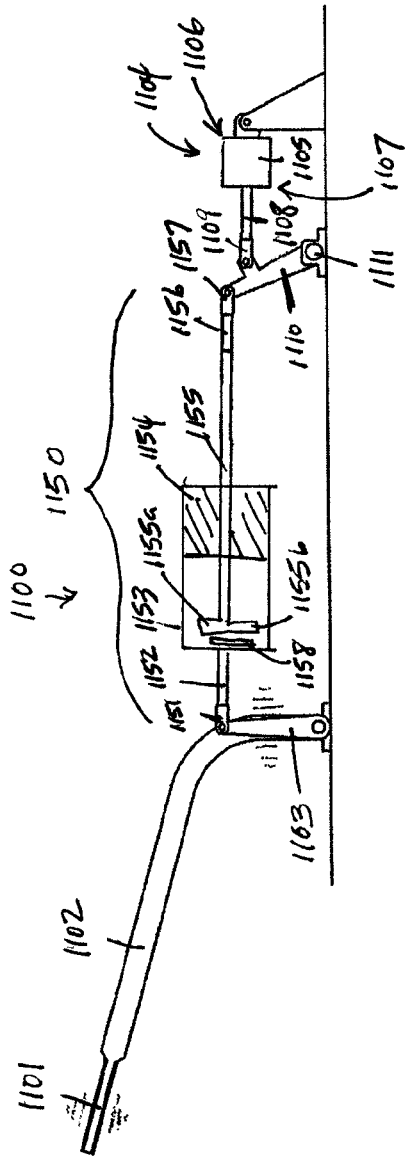

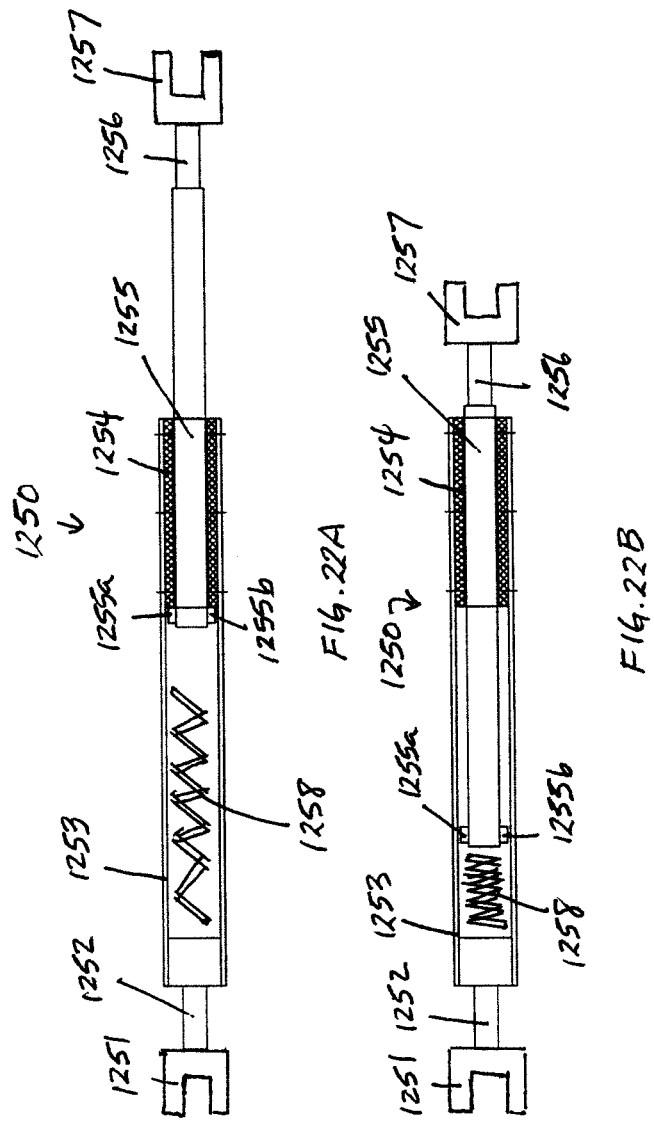

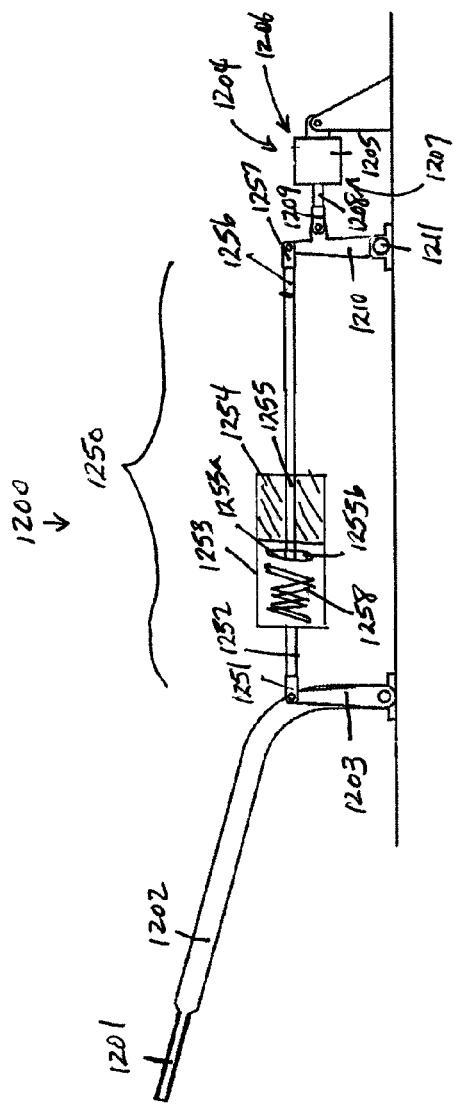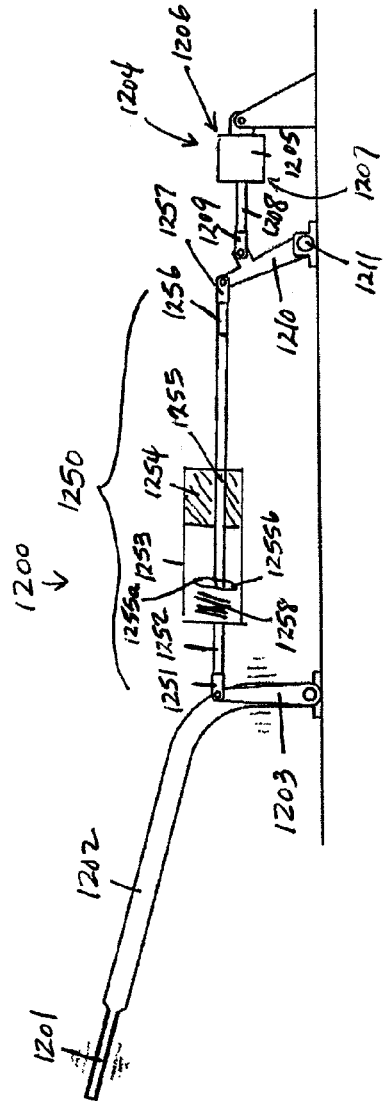
FIG. 23A
FIG. 23B

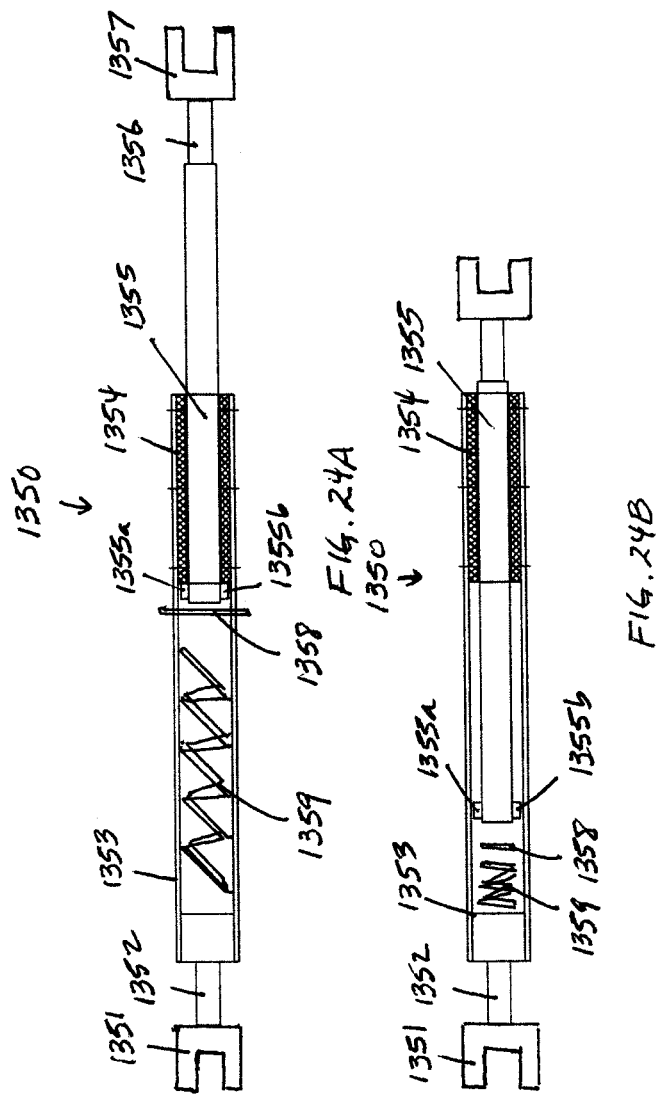

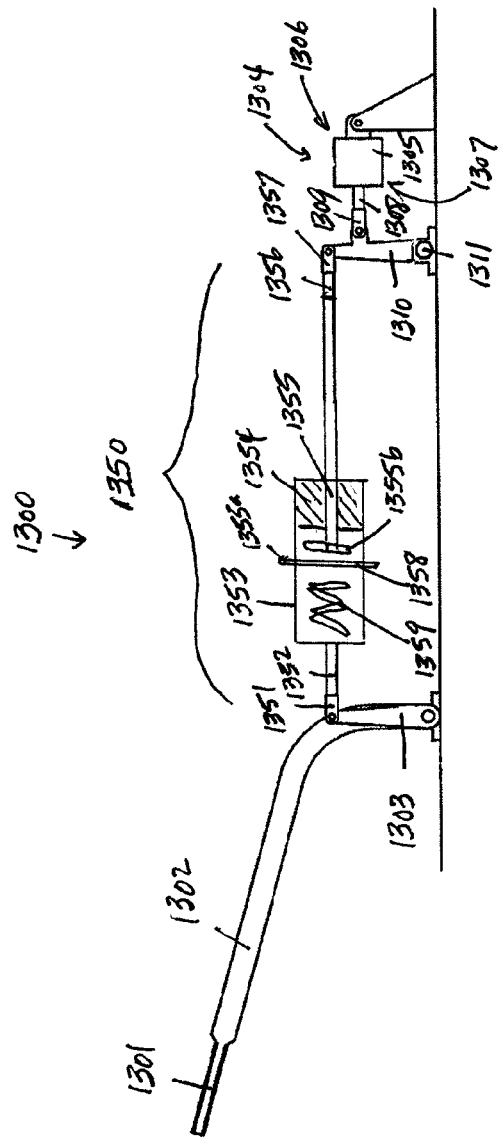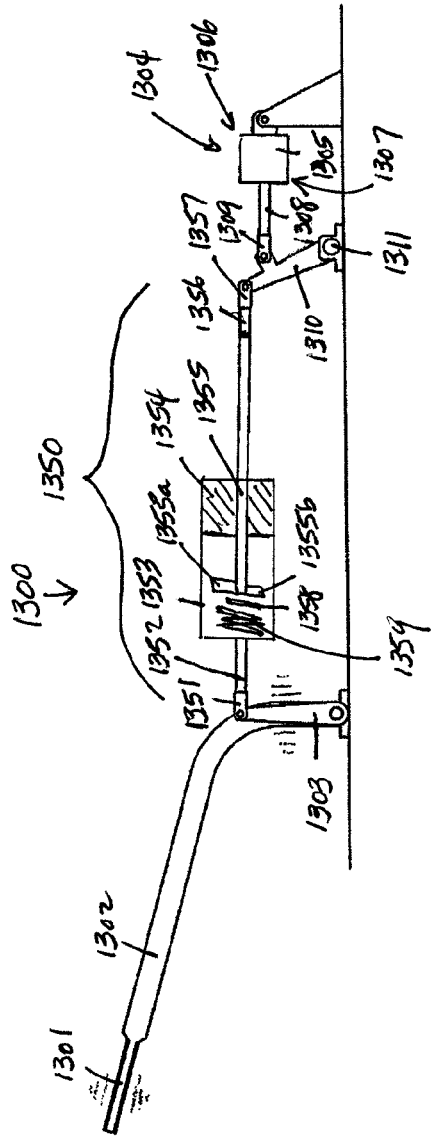

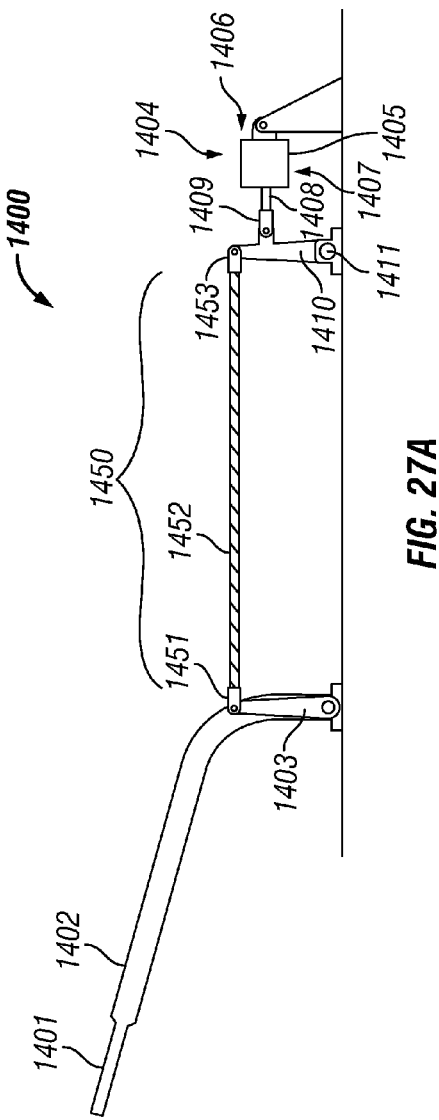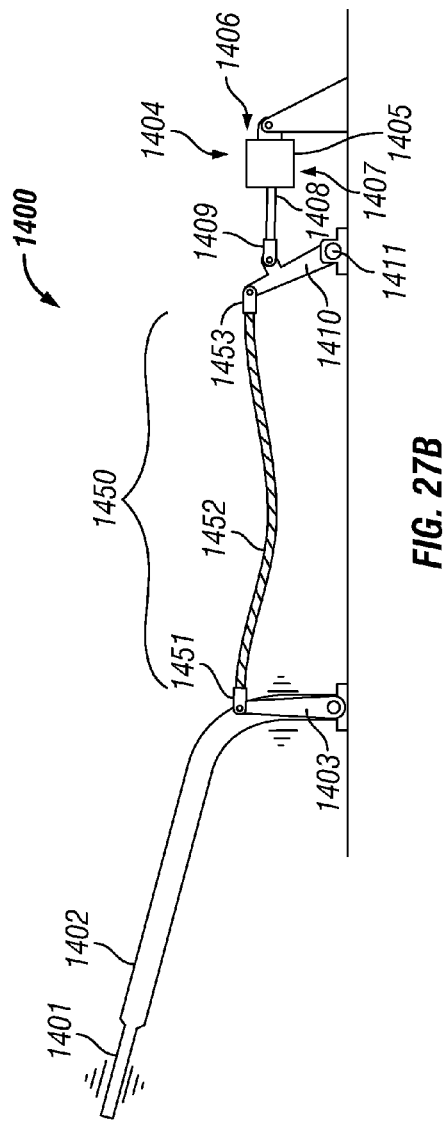

LINKAGE ASSEMBLY FOR DRILLING OR MOBILE WELL SERVICING RIG BRAKING SYSTEM

CROSS-REFERENCE TO RELATED APPLICATION

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

The present disclosure generally concerns drilling rig and mobile well servicing rig braking systems. More specifically the present disclosure concerns improved linkage assemblies for a drilling or mobile well servicing rig braking system, and drilling or mobile well servicing rig braking systems comprising such improved linkage assemblies.

2. Description of the Related Art

Drilling rigs and mobile well servicing rigs generally include a manual braking system to allow the operator to control the position of the traveling blocks, and additionally are often equipped with an emergency brake safety system that prevents or a least reduces the possibility of the traveling blocks from reaching a crown out or floor out position. The techniques to actuate the emergency brake and prevent crown outs and floor outs can vary. These techniques include use of wire trip sensors, radar, ultrasonic sensors located near the crown, drum encoders, and wire rope counters as sensing devices that determine if the blocks are too close to the crown. In addition, the emergency brake safety system may incorporate programmable logic control circuits to detect and actuate cylinders. In another embodiment, the emergency brake safety system can be configured in a "fail safe" mode. When a circuit is broken in the fail safe mode, a cylinder is activated, thereby activating the braking system on the hoist to prevent the drilling line from additional movement.

While many different methods exist for preventing crown outs and floor outs, most have a single commonality, that being when a sensor or other device detects the pending crown out or floor out, the device sets the brakes for the tubing drum via a pneumatic or hydraulic cylinder. U.S. Pat. No. 7,513,338 ("the '338 patent), incorporated herein by reference in its entirety, describes a conventional tubing drum brake assembly (see FIG. 1 of the '338 patent). As shown in FIG. 1 of the '338 patent, the brake bands are actuated by the equalizer bar rotating in the clockwise direction, which generates tension on the brake bands, causing them to tighten up and apply pressure to the brake flanges. The pressure applied by the brake bands causes the tubing drum to slow or stop its rotation about the tubing core depending on the amount of pressure applied by the brake bands and causing a corresponding reduction in movement of the feed line (see FIGS. 1-4 of the '338 patent).

As further shown in FIG. 1 of the '338 patent, a conventional braking system can rotate the equalizing bar by applying a downward force on a brake handle. The brake handle is attached to a brake lever, which rotates about a pivot point when the downward force is applied to the brake handle. The rotation of the brake lever rotates a bell crank in a clockwise direction, the bell crank and brake lever being mechanically coupled to one another. The bell crank is attached at one end to the brake lever and attached at another end to the brake linkage and rotates about the pivot point. The brake linkage is attached at the other end to the equalizer bar. The rotation of the bell crank creates a tension in the brake linkage, thereby causing the equalizer bar to rotate in the clockwise direction about a pivot point on the equalizer bar.

In order to effect the safe braking of the rig or hoist, the braking system must operate under tight tolerances, which necessitates that the brake bands remain in constant or virtually constant contact with the brake flanges. Because the weight of the brake handle and brake lever will provide sufficient down force to slow the rotation of the drum, the operator typically will lift up on the brake handle and lever (see FIG. 2 and FIG. 3 of the '338 patent). By lifting the brake handle and lever, the brake bands provide less pressure on the brake flanges, thereby allowing the drum to rotate at a higher rate of speed.

As discussed above and shown in greater detail in FIG. 4 and FIG. 5 of the '338 patent, most conventional rig braking systems include an emergency brake safety system to prevent a crown out or floor out event. The emergency brake generally includes a cylinder that can be pneumatically or hydraulically operated. When activated, the cylinder suddenly extends a piston rod or shaft outward and provides pressure on a lever that is attached to the equalizer bar. In response to the pressure, the equalizer bar rotates clockwise causing the brake bands to apply pressure to the brake flange, thereby slowing the drum and the feed line. However, because the equalizer bar is also mechanically linked to the brake handle via the brake linkage, bell crank, and brake lever, the brake handle suddenly moves in the downward direction in response to the actuation of the cylinder. If the rig operator is in the vicinity of, or is holding the brake handle up to reduce braking pressure on the drum, actuation of the cylinder may cause injury to the operator due to the sudden and forceful downward movement of the brake handle.

To address this problem, the '338 patent discloses the use of a spring to connect the brake handle and the bell crank. However, this arrangement still transmits considerable movement and force to the brake handle upon actuation of the emergency brake, potentially injuring the operator.

Therefore, there is a need in the art for a braking system that allows the emergency brake cylinder to act independently of the brake handle, so when the emergency brake cylinder is actuated due to the detection of a crown out, floor out or other action or problem, the brake handle will not react suddenly and violently and potentially cause injury to the operator.

BRIEF SUMMARY OF THE INVENTION

The present disclosure provides fluid cylinder linkage assemblies for a manual drilling rig braking assembly that prevents the emergency brake actuation cylinder from forcing the manual brake handle down upon actuation, but allows normal manual brake operation under all other operating circumstances.

The present disclosure provides a fluid cylinder linkage assembly for a rig brake system, comprising a rod end adaptor having a first end and a second end, a fluid cylinder comprising a head having a first vent, a tube having a first end and a second end, the first end of the tube attached to the head, a cap having a second vent, the second end of the tube attached to the cap, a piston disposed within the tube, and a rod having a first end and a second end, the first end of the rod connected to the piston, and the second end of the rod connected to the rod end adaptor, wherein at least a portion of the first end of the rod is disposed within the tube, a cap end adaptor having a first end and a second end, the first end of the cap end adaptor connected to the cap of the fluid cylinder, and a fluid control valve connected to the cap or the head of the fluid cylinder. In certain embodiments, the fluid control valve is connected to the second vent of the cap of the fluid cylinder, while in other embodiments the fluid control valve is connected to the first vent of the head of the fluid cylinder. In particular embodiments, the fluid cylinder and the fluid control valve utilize air, hydraulic fluid, hydraulic oil, water, or nitrogen gas. In other embodiments, the fluid cylinder linkage assembly further comprises a first connecting rod having a first end and a second end, wherein the first end of the first connecting rod is connected to the second end of the cap end adaptor, or the second end of the first connecting rod is connected to the first end of the rod end adaptor. In additional embodiments, the fluid cylinder linkage assembly further comprises a first connecting rod having a first end and a second end, wherein the second end of the first connecting rod is connected to the first end of the rod end adaptor, and a second connecting rod having a first end and a second end, wherein the first end of the second connecting rod is connected to the second end of the cap end adaptor.

Thus, the present disclosure provides a fluid cylinder linkage braking assembly for a rig, comprising a brake lever, a fluid cylinder linkage assembly comprising a rod end adaptor having a first end and a second end, a fluid cylinder comprising a head having a first vent, a tube having a first end and a second end, the first end of the tube attached to the head, a cap having a second vent, the second end of the tube attached to the cap, a piston disposed within the tube, and a rod having a first end and a second end, the first end of the rod connected to the piston, and the second end of the rod connected to the rod end adaptor, wherein at least a portion of the first end of the rod is disposed within the tube, a cap end adaptor having a first end and a second end, the first end of the cap end adaptor connected to the cap of the cylinder, and a fluid control valve connected to the cap or the head of the fluid cylinder, an emergency brake actuation cylinder comprising a body and a rod having a distal end, the distal end of the rod of the emergency brake actuation cylinder mechanically linked to the second end of the cap end adaptor, and a brake actuation shaft mechanically linked to the emergency brake and the second end of the cap end adaptor. In certain embodiments, the fluid control valve is connected to the second vent of the cap of the fluid cylinder, while in other embodiments the fluid control valve is connected to the first vent of the head of the fluid cylinder. In particular embodiments, the fluid cylinder and the fluid control valve utilize air, hydraulic fluid, hydraulic oil, water, or nitrogen gas. In additional embodiments, the fluid cylinder linkage braking assembly further comprises a brake handle coupled to the brake lever. In still other embodiments, the fluid cylinder linkage braking assembly further comprises a first connecting rod having a first end and a second end, wherein the first end of the first connecting rod is connected to the second end of the cap end adaptor, or the second end of the first connecting rod is connected to the first end of the rod end adaptor. In yet other embodiments the fluid cylinder linkage braking assembly further comprises a first connecting rod having a first end and a second end, wherein the second end of the first connecting rod is connected to the first end of the rod end adaptor, and a second connecting rod having a first end and a second end, wherein the first end of the second connecting rod is connected to the second end of the cap end adaptor.

The present disclosure additionally provides a fluid cylinder linkage assembly for a rig brake system, comprising a rod end adaptor having a first end and a second end, a fluid cylinder comprising a head having a first vent, a tube having a first end and a second end, the first end of the tube attached to the head, a cap having a second vent, the second end of the tube attached to the cap, a piston disposed within the tube, and a rod having a first end and a second end, the first end of the rod connected to the piston, and the second end of the rod connected to the rod end adaptor, wherein at least a portion of the first end of the rod is disposed within the tube, a cap end adaptor having a first end and a second end, the first end of the cap end adaptor connected to the cap of the fluid cylinder, and a fluid control valve connected to the cap and the head of the fluid cylinder. In certain embodiments, the fluid control valve is connected to the first vent of the head of the fluid cylinder and the second vent of the cap of the fluid cylinder. In particular embodiments, the fluid cylinder and the fluid control valve utilize air, hydraulic fluid, hydraulic oil, water, or nitrogen gas. In other embodiments, the fluid cylinder linkage assembly further comprises a first connecting rod having a first end and a second end, wherein the first end of the first connecting rod is connected to the second end of the cap end adaptor, or the second end of the first connecting rod is connected to the first end of the rod end adaptor. In additional embodiments, the fluid cylinder linkage assembly further comprises a first connecting rod having a first end and a second end, wherein the second end of the first connecting rod is connected to the first end of the rod end adaptor, and a second connecting rod having a first end and a second end, wherein the first end of the second connecting rod is connected to the second end of the cap end adaptor.

Thus, the present disclosure also provides a fluid cylinder linkage braking assembly for a rig, comprising a brake lever, a fluid cylinder linkage assembly comprising a rod end adaptor having a first end and a second end, a fluid cylinder comprising a head having a first vent, a tube having a first end and a second end, the first end of the tube attached to the head, a cap having a second vent, the second end of the tube attached to the cap, a piston disposed within the tube, and a rod having a first end and a second end, the first end of the rod connected to the piston, and the second end of the rod connected to the rod end adaptor, wherein at least a portion of the first end of the rod is disposed within the tube, a cap end adaptor having a first end and a second end, the first end of the cap end adaptor connected to the cap of the cylinder, and a fluid control valve connected to the cap and the head of the fluid cylinder, an emergency brake actuation cylinder comprising a body and a rod having a distal end, the distal end of the rod of the emergency brake actuation cylinder mechanically linked to the second end of the cap end adaptor, and a brake actuation shaft mechanically linked to the emergency brake and the second end of the cap end adaptor. In certain embodiments, the fluid control valve is connected to the first vent of the head of the fluid cylinder and the second vent of the cap of the fluid cylinder. In particular embodiments, the fluid cylinder and the fluid control valve utilize air, hydraulic fluid, hydraulic oil, water, or nitrogen gas. In other embodiments, the fluid cylinder linkage braking assembly further comprises a brake handle coupled to the brake lever. In yet other embodiments, the fluid cylinder linkage braking assembly further comprises a first connecting rod having a first end and a second end, wherein the first end of the first connecting rod is connected to the second end of the cap end adaptor, or the second end of the first connecting rod is connected to the first end of the rod end adaptor. In additional embodiments, the fluid cylinder linkage braking assembly further comprises a first connecting rod having a first end and a second end, wherein the second end of the first connecting rod is connected to the first end of the rod end adaptor, and a second connecting rod having a first end and a second end, wherein the first end of the second connecting rod is connected to the second end of the cap end adaptor.

The present disclosure additionally provides a fluid cylinder linkage assembly for a rig brake system, comprising a connector, a fluid cylinder comprising a head having a first vent, a tube having a first end and a second end, the first end of the tube attached to the head, a cap having a second vent, the second end of the tube attached to the cap, a piston disposed within the tube, and a rod having a first end and a second end, the first end of the rod connected to the piston, and the second end of the rod connected to the connector, wherein at least a portion of the first end of the rod is disposed within the tube, a pivot arm connected to the head or the cap of the fluid cylinder, a brake lever connected to the pivot arm, and a fluid control valve connected to the cap or the head of the fluid cylinder. In certain embodiments, the pivot arm is connected to the cap of the fluid cylinder, while in other embodiments the pivot arm is connected to the head of the fluid cylinder. In further embodiments, the fluid control valve is connected to the second vent of the cap of the fluid cylinder, while in yet further embodiments, the fluid control valve is connected to the first vent of the head of the fluid cylinder. In particular embodiments, the fluid cylinder and the fluid control valve utilize air, hydraulic fluid, hydraulic oil, water, or nitrogen gas.

Thus, the present disclosure additionally provides a fluid cylinder linkage braking assembly for a rig, comprising a fluid cylinder linkage assembly comprising a connector, a fluid cylinder comprising a head having a first vent, a tube having a first end and a second end, the first end of the tube attached to the head, a cap having a second vent, the second end of the tube attached to the cap, a piston disposed within the tube, and a rod having a first end and a second end, the first end of the rod connected to the piston, and the second end of the rod connected to the connector, wherein at least a portion of the first end of the rod is disposed within the tube, a first pivot arm connected to the head or the cap of the fluid cylinder, a brake lever connected to the pivot arm, and a fluid control valve connected to the cap or the head of the fluid cylinder, a second pivot arm connected to the connector, a connecting rod having a first end and a second end, the first end of the connecting rod connected to the second pivot arm, a third pivot arm connected to the second end of the connecting rod, an emergency brake actuation cylinder comprising a body and a rod having a distal end, the distal end of the rod of the emergency brake actuation cylinder mechanically linked to the third pivot arm, and a brake actuation shaft mechanically linked to the emergency brake and the third pivot arm. In certain embodiments, the first pivot arm is connected to the cap of the fluid cylinder, while in other embodiments, the first pivot arm is connected to the head of the fluid cylinder. In further embodiments, the fluid control valve is connected to the second vent of the cap of the fluid cylinder, while in still further embodiments, the fluid control valve is connected to the first vent of the head of the fluid cylinder. In particular embodiments, the fluid cylinder and the fluid control valve utilize air, hydraulic fluid, hydraulic oil, water, or nitrogen gas. In additional embodiments, the fluid cylinder linkage braking assembly further comprises a brake handle coupled to the brake lever.

The present disclosure further provides a fluid cylinder linkage assembly for a rig brake system, comprising a connector, a fluid cylinder comprising a head having a first vent, a tube having a first end and a second end, the first end of the tube attached to the head, a cap having a second vent, the second end of the tube attached to the cap, a piston disposed within the tube, and a rod having a first end and a second end, the first end of the rod connected to the piston, and the second end of the rod connected to the connector, wherein at least a portion of the first end of the rod is disposed within the tube, a pivot arm connected to the head or the cap of the fluid cylinder, a brake lever connected to the pivot arm, and a fluid control valve connected to the cap and the head of the fluid cylinder. In certain embodiments the pivot arm is connected to the cap of the fluid cylinder, while in other embodiments the pivot arm is connected to the head of the fluid cylinder. In further embodiments the fluid control valve is connected to the first vent of the head of the fluid cylinder and the second vent of the cap of the fluid cylinder. In particular embodiments the fluid cylinder and the fluid control valve utilize air, hydraulic fluid, hydraulic oil, water, or nitrogen gas.

Thus, the present disclosure also provides a fluid cylinder linkage braking assembly for a rig, comprising a fluid cylinder linkage assembly comprising a connector, a fluid cylinder comprising a head having a first vent, a tube having a first end and a second end, the first end of the tube attached to the head, a cap having a second vent, the second end of the tube attached to the cap, a piston disposed within the tube, and a rod having a first end and a second end, the first end of the rod connected to the piston, and the second end of the rod connected to the connector, wherein at least a portion of the first end of the rod is disposed within the tube, a first pivot arm connected to the head or the cap of the fluid cylinder, a brake lever connected to the pivot arm, and a fluid control valve connected to the cap and the head of the fluid cylinder, a second pivot arm connected to the connector, a connecting rod having a first end and a second end, the first end of the connecting rod connected to the second pivot arm, a third pivot arm connected to the second end of the connecting rod, an emergency brake actuation cylinder comprising a body and a rod having a distal end, the distal end of the rod of the emergency brake actuation cylinder mechanically linked to the third pivot arm, and a brake actuation shaft mechanically linked to the emergency brake and the third pivot arm. In certain embodiments the first pivot arm is connected to the cap of the fluid cylinder, while in other embodiments the first pivot arm is connected to the head of the fluid cylinder. In further embodiments the fluid control valve is connected to the first vent of the head of the fluid cylinder and the second vent of the cap of the fluid cylinder. In particular embodiments the fluid cylinder and the fluid control valve utilize air, hydraulic fluid, hydraulic oil, water, or nitrogen gas. In additional embodiments the fluid cylinder linkage braking assembly further comprises a brake handle coupled to the brake lever.

The present disclosure also provides a rotary fluid cylinder linkage assembly for a rig brake system, comprising a rotary actuator comprising a tube having a first end having a first vent and a second end having a second vent, a pinion shaft connected to the tube and rotatably engaged with a rack having a first end and a second end, the rack disposed within the tube, a first piston disposed within the tube and connected to the first end of the rack, and a second piston disposed within the tube and connected to the second end of the rack, a brake lever connected to the pinion shaft, and a fluid control valve connected to the first or second end of the tube, as well as a rotary fluid cylinder linkage braking assembly for a rig comprising the rotary fluid cylinder linkage assembly. In certain embodiments the fluid control valve is connected to the first end of the tube, while in other embodiments the fluid control valve is connected to the second end of the tube. In particular embodiments the rotary actuator and the fluid control valve utilize air, hydraulic fluid, hydraulic oil, water, or nitrogen gas.

Additionally, the present disclosure provides a hydraulic cylinder linkage braking assembly for a rig, comprising a stand, a brake lever having a first end and a second end attached to the stand between the first end and the second end of the brake lever, a hydraulic fluid master cylinder connected to the stand, comprising a head, a tube having a first end and a second end, the first end of the tube attached to the head, a cap attached to the second end of the tube, a piston disposed within the tube, and a rod having a first end and a second end, the first end of the rod connected to the piston, and the second end of the rod connected to the brake lever, wherein at least a portion of the first end of the rod is disposed within the tube, a hydraulic fluid slave cylinder comprising a head, a tube having a first end and a second end, the first end of the tube attached to the head, a cap attached to the second end of the tube, a piston disposed within the tube, and a rod having a first end and a second end, the first end of the rod connected to the piston, and the second end of the rod connected to a first pivot arm, wherein at least a portion of the first end of the rod is disposed within the tube, a first hydraulic line connecting the head of the hydraulic fluid master cylinder to the cap of the hydraulic fluid slave cylinder, a second hydraulic line connecting the cap of the hydraulic fluid master cylinder to the head of the hydraulic fluid slave cylinder, a hydraulic control valve connected to the first hydraulic line by a third hydraulic line and the second hydraulic line by a fourth hydraulic line, the hydraulic control valve comprising a pilot port, and the fourth hydraulic line comprising a one-way check valve, an emergency brake actuation hydraulic cylinder comprising a body and a rod having a distal end, the distal end of the rod of the emergency brake actuation cylinder connected to a second pivot arm, a fifth hydraulic line connecting the cap end of the emergency brake actuation hydraulic cylinder and the pilot port of the hydraulic control valve, and a brake actuation shaft mechanically linked to the first pivot arm. In certain embodiments the hydraulic cylinder linkage braking assembly further comprises a manual valve connected to the cap end of the hydraulic fluid master cylinder by a sixth hydraulic line and to the head end of the hydraulic fluid master cylinder by a seventh hydraulic line.

The present disclosure also provides a hydraulic cylinder linkage braking assembly for a rig, comprising a stand, a brake lever having a first end and a second end attached to the stand between the first end and the second end of the brake lever, a hydraulic fluid master cylinder connected to the stand, comprising a head, a tube having a first end and a second end, the first end of the tube attached to the head, a cap attached to the second end of the tube, a piston disposed within the tube, and a rod having a first end and a second end, the first end of the rod connected to the piston, and the second end of the rod connected to the brake lever, wherein at least a portion of the first end of the rod is disposed within the tube, a hydraulic fluid slave cylinder comprising a head, a tube having a first end and a second end, the first end of the tube attached to the head, a cap attached to the second end of the tube, a piston disposed within the tube, and a rod having a first end and a second end, the first end of the rod connected to the piston, and the second end of the rod connected to a first pivot arm, wherein at least a portion of the first end of the rod is disposed within the tube, a first hydraulic line connecting the head of the hydraulic fluid master cylinder to the cap of the hydraulic fluid slave cylinder, a second hydraulic line connecting the cap of the hydraulic fluid master cylinder to the head of the hydraulic fluid slave cylinder, a relief valve connected to the first hydraulic line by a third hydraulic line and the second hydraulic line by a fourth hydraulic line, an emergency brake actuation hydraulic cylinder comprising a body and a rod having a distal end, the distal end of the rod of the emergency brake actuation cylinder connected to a second pivot arm, a fifth hydraulic line connecting the cap end of the emergency brake actuation hydraulic cylinder to the fourth hydraulic line, and a brake actuation shaft mechanically linked to the first pivot arm. In certain embodiments the hydraulic cylinder linkage braking assembly further comprises a manual valve connected to the cap end of the hydraulic fluid master cylinder by a sixth hydraulic line and to the head end of the hydraulic fluid master cylinder by a seventh hydraulic line.

The present disclosure further provides a rotary linkage assembly for a rig brake system, comprising a clutch assembly having a first stop plate and a second stop plate, a clutch plate, and a shaft connected to the clutch plate, and a brake lever connected to the shaft, as well as a rotary linkage braking assembly for a rig comprising the rotary linkage assembly. The present disclosure additionally provides a rotary linkage assembly for a rig brake system, comprising a clutch assembly having a first stop plate, a first spring connected to the first stop plate, a second stop plate, a second spring connected to the second stop plate, a clutch plate, and a shaft connected to the clutch plate, and a brake lever connected to the shaft, as well as a rotary linkage braking assembly for a rig comprising the rotary linkage assembly.

The present disclosure also provides a scoping linkage assembly for a rig brake system, comprising an outer tube having a first end and a second end, a bushing disposed within the outer tube proximal to the second end of the outer tube, and a shaft having a first end and a second end, the first end of the shaft disposed through the bushing and into the outer tube, and comprising at least a first projection, as well as a scoping linkage braking assembly for a rig comprising the scoping linkage assembly. In certain embodiments, the scoping linkage assembly further comprises a first connecting rod having a first end and a second end, wherein the first end of the first connecting rod is connected to the first end of the outer tube, or the second end of the first connecting rod is connected to the second end of the shaft. In other embodiments, the scoping linkage assembly further comprises a first connecting rod having a first end and a second end, wherein the first end of the first connecting rod is connected to the first end of the outer tube, and a second connecting rod having a first end and a second end, wherein the first end of the second connecting rod is connected to the second end of the shaft. In yet other embodiments, the scoping linkage assembly further comprises a first clevis connected to the second end of the first connecting rod, and a second clevis connected to the second end of the second connecting rod. In additional embodiments the scoping linkage assembly further comprises a shear pin disposed through the outer tube between the first end of the outer tube and the first end of the shaft. In still other embodiments the scoping linkage assembly further comprises a spring disposed within the outer tube between the first end of the outer tube and the first end of the shaft. In particular embodiments the scoping linkage assembly further comprises a shear pin disposed through the outer tube between the first end of the outer tube and the first end of the shaft, and a spring disposed within the outer tube between the first end of the outer tube and the shear pin.

Thus, the present disclosure provides a scoping linkage braking assembly for a rig, comprising a brake lever, a first pivot arm mechanically linked to the brake lever, a scoping linkage assembly comprising a first clevis connected to the first pivot arm, an outer tube having a first end and a second end, the first end of the outer tube connected to the first clevis, a bushing disposed within the outer tube proximal to the second end of the outer tube, a shaft having a first end and a second end, the first end of the shaft disposed through the bushing and into the outer tube, and comprising at least a first projection, and a second clevis connected to the second end of the shaft, a second pivot arm connected to the second clevis, an emergency brake actuation cylinder comprising a body and a rod having a distal end, the distal end of the rod of the emergency brake actuation cylinder mechanically linked to the second pivot arm, and a brake actuation shaft mechanically linked to the emergency brake and the second pivot arm. In certain embodiments the scoping linkage braking assembly further comprises a shear pin disposed through the outer tube between the first end of the outer tube and the first end of the shaft. In other embodiments the scoping linkage braking assembly further comprises a spring disposed within the outer tube between the first end of the outer tube and the first end of the shaft. In additional embodiments the scoping linkage braking assembly further comprises a shear pin disposed through the outer tube between the first end of the outer tube and the first end of the shaft, and a spring disposed within the outer tube between the first end of the outer tube and the shear pin.

The present invention also provides a cable linkage assembly for a rig brake system, comprising a cable having a first end and a second end, a first clevis connected to the first end of the cable, and a second clevis connected to the second end of the cable. Thus, the present disclosure provides a cable linkage braking assembly for a rig, comprising a brake lever, a first pivot arm mechanically linked to the brake lever, a cable linkage assembly comprising a cable having a first end and a second end, a first clevis connected to the first end of the cable, and a second clevis connected to the second end of the cable, a second pivot arm connected to the second clevis, an emergency brake actuation cylinder comprising a body and a rod having a distal end, the distal end of the rod of the emergency brake actuation cylinder mechanically linked to the second pivot arm, and a brake actuation shaft mechanically linked to the emergency brake and the second pivot arm.

Throughout this disclosure, unless the context dictates otherwise, the word "comprise" or variations such as "comprises" or "comprising," is understood to mean "includes, but is not limited to" such that other elements that are not explicitly mentioned may also be included. Further, unless the context dictates otherwise, use of the term "a" may mean a singular object or element, or it may mean a plurality, or one or more of such objects or elements.

BRIEF DESCRIPTION OF THE SEVERAL VIEWS OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 7. Primary components of an alternate embodiment of a fluid cylinder linkage assembly.

FIG. 10A and FIG. 10B. Positions of brake system comprising the alternate embodiment of a fluid cylinder linkage assembly shown in FIG. 7 under normal operating conditions (FIG. 10A) and upon activation of emergency brake actuation cylinder (FIG. 10B).

FIG. 11A, FIG. 11B, and FIG. 11C. Alternate embodiment of a fluid cylinder linkage assembly. FIG. 11A. Modified handle and fluid cylinder assembly. FIG. 11B. Brake system comprising a modified handle and fluid cylinder assembly as shown in FIG. 11A under normal operating conditions. FIG. 11C. Brake system comprising a modified handle and fluid cylinder assembly as shown in FIG. 11A upon actuation of emergency brake actuation cylinder.

FIG. 12A and FIG. 12B. Alternate embodiment of a fluid cylinder linkage brake system. FIG. 12A. Brake system comprising a modified handle and fluid cylinder assembly under normal operating conditions. FIG. 12B. Brake system comprising a modified handle and fluid cylinder assembly upon actuation of emergency brake actuation cylinder.

FIG. 13A and FIG. 13B. An embodiment of a rotary fluid cylinder linkage assembly. FIG. 13A. Rotary fluid cylinder linkage assembly under normal operating conditions. FIG. 13B. Rotary fluid cylinder linkage assembly upon actuation of emergency brake actuation cylinder.

FIG. 16A, FIG. 16B, and FIG. 16C. An embodiment of a rotary linkage assembly. FIG. 16A. Rotary linkage assembly under normal operating conditions. FIG. 16B. Rotary linkage assembly upon manual brake actuation. FIG. 16C. Rotary linkage assembly upon actuation of emergency brake actuation cylinder.

FIG. 17A, FIG. 17B, and FIG. 17C. An alternate embodiment of a rotary linkage assembly. FIG. 17A. Rotary linkage assembly under normal operating conditions. FIG. 17B.

Rotary linkage assembly upon manual brake actuation. FIG. 17C. Rotary linkage assembly upon actuation of emergency brake actuation cylinder.

FIG. 18A and FIG. 18B. An embodiment of a scoping linkage assembly. FIG. 18A. Scoping linkage assembly under normal operating conditions. FIG. 18B. Scoping linkage assembly upon actuation of emergency brake actuation cylinder.

FIG. 19A and FIG. 19B. Positions of brake system comprising a scoping linkage assembly shown in FIG. 18 under normal operating conditions (FIG. 19A) and upon activation of emergency brake actuation cylinder (FIG. 19B).

FIG. 20A and FIG. 20B. An alternate embodiment of a scoping linkage assembly. FIG. 20A. Scoping linkage assembly under normal operating conditions. FIG. 20B. Scoping linkage assembly upon actuation of emergency brake actuation cylinder.

FIG. 21A and FIG. 21B. Positions of brake system comprising a scoping linkage assembly shown in FIG. 20 under normal operating conditions (FIG. 21A) and upon activation of emergency brake actuation cylinder (FIG. 21B).

FIG. 22A and FIG. 22B. An alternate embodiment of a scoping linkage assembly. FIG. 22A. Scoping linkage assembly under normal operating conditions. FIG. 22B. Scoping linkage assembly upon actuation of emergency brake actuation cylinder.

FIG. 23A and FIG. 23B. Positions of brake system comprising a scoping linkage assembly shown in FIG. 22 under normal operating conditions (FIG. 23A) and upon activation of emergency brake actuation cylinder (FIG. 23B).

FIG. 24A and FIG. 24B. An alternate embodiment of a scoping linkage assembly. FIG. 24A. Scoping linkage assembly under normal operating conditions. FIG. 24B. Scoping linkage assembly upon actuation of emergency brake actuation cylinder.

FIG. 25A and FIG. 25B. Positions of brake system comprising a scoping linkage assembly shown in FIG. 24 under normal operating conditions (FIG. 25A) and upon activation of emergency brake actuation cylinder (FIG. 25B).

FIG. 27A and FIG. 27B. Positions of brake system comprising a cable linkage assembly shown in FIG. 26 under normal operating conditions (FIG. 27A) and upon activation of emergency brake actuation cylinder (FIG. 27B).

DETAILED DESCRIPTION OF THE INVENTION

The present disclosure provides a fluid cylinder linkage assembly for use with drilling rig braking systems. The disclosed fluid cylinder linkage braking assembly effectively decouples the emergency brake actuation cylinder shaft and the brake lever upon activation of the emergency brake actuation cylinder, thereby preventing the brake lever from rapid and forceful downward movement, which could injure the operator.

Figure 1:
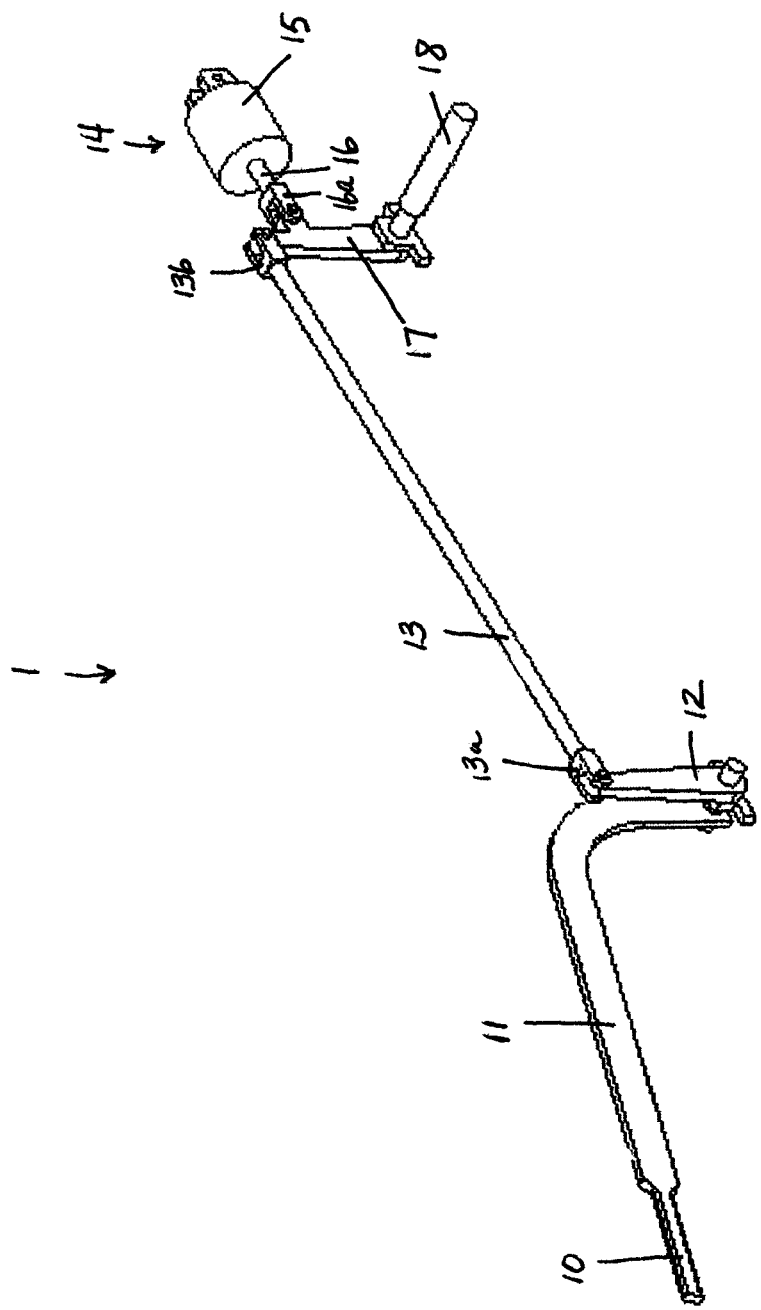
FIG. 1. Prior art drilling rig brake linkage system.

Referring now to FIG. 1, the basic components of an embodiment of a prior art drilling rig braking assembly 1 are shown. Braking assembly 1 includes a manual brake handle 10, which is connected to a manual brake lever 11, which is mechanically coupled to one end of a first pivot arm 12, the other end of which is mechanically coupled via a first clevis 13a to one end of a connecting rod 13, the other end of which is mechanically coupled via a second clevis 13b to one end of a second pivot arm 17, the other end of which is mechanically coupled to a brake actuator shaft 18. Also shown in FIG. 1 is an emergency brake actuation cylinder 14 comprising a cylinder body 15 and a shaft (or rod) 16, the distal end of which is mechanically coupled via a third clevis 16a to the second pivot arm 17 between the second clevis 13b of the connecting rod 13 and the brake actuator shaft 18. FIG. 1 depicts a simplified, typical arrangement of components. The actuation cylinder rod 16 is mechanically coupled to the brake actuator shaft 18 and either directly or indirectly mechanically coupled to the connecting rod 13. Operation of braking assembly 1 can be performed either manually, by an operator (not shown) pushing down on the manual brake handle 10, which pushes down manual brake lever 11, which pulls first pivot arm 12, connecting rod 13, and second pivot arm 17 (to the left in FIG. 1), thereby rotating the brake actuator shaft 18 and actuating the brake (not shown), or in certain emergency situations automatically through activation of the emergency brake actuation cylinder 14, which causes piston or shaft 16 to extend, pushing the second pivot arm 17 (to the left in FIG. 1), thereby rotating the brake actuator shaft 18 and actuating the brake (not shown).

Figure 2:
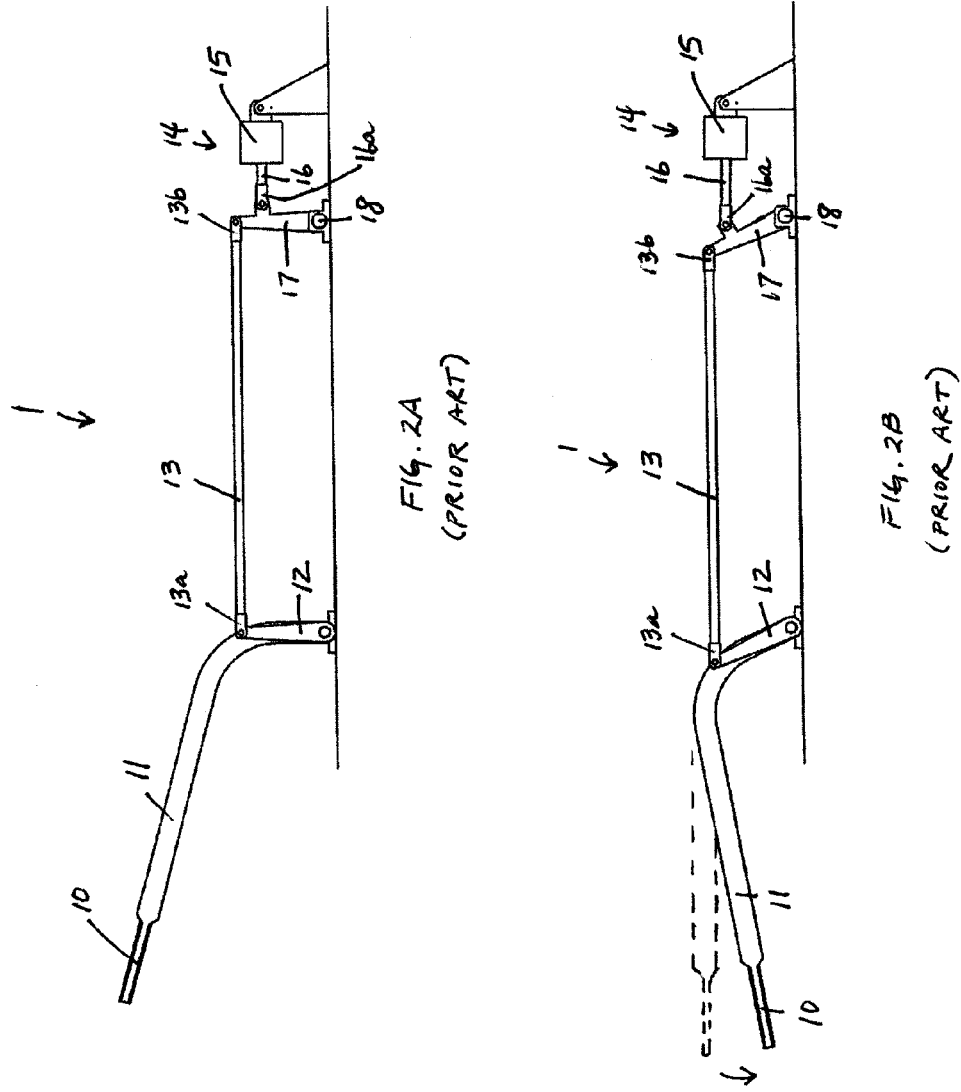
FIG. 2A and FIG. 2B. Position of prior art brake system shown in FIG. 1 under normal operating conditions (FIG. 2A) and upon activation of the emergency brake actuation cylinder (FIG. 2B).

Referring now to FIG. 2A, shown is the position of the prior art drilling rig brake system 1 shown in FIG. 1 under normal operating conditions. Under normal operating conditions the manual brake handle 10 and manual brake lever 11 are in a normal position, although under certain normal operating conditions the operator (not shown) may actually raise the manual brake handle 10 and the manual brake lever 11 in order to lessen the effect of the down force of the manual brake handle 10 and the manual brake lever 11 on the brake actuator shaft 18. Braking is accomplished by an operator (not shown) pushing down on the manual brake handle 10 and the manual brake lever 11.

Referring now to FIG. 2B, shown is the position of the prior art drilling rig braking assembly 1 shown in FIG. 1 after actuation of the emergency brake actuation cylinder 14. Actuation of the emergency brake actuation cylinder 14, causes the shaft (or rod) 16 to extend, pushing the second pivot arm 17 (to the left in FIG. 2B), thereby rotating brake actuator shaft 18, which stops the traveling block (not shown). However, due to the mechanical coupling (in part via first clevis 13a, second clevis 13b, and third clevis 16a) of the components of the braking assembly 1, when the second pivot arm 17 is moved due to the extension of the shaft 16, this also forces the connecting rod 13 and the first pivot arm 12 toward the manual brake lever 11 and the manual brake handle 10 (to the left in FIG. 2B), which in turn forces the manual brake handle 10 and manual brake lever 11 to a lower position (represented by the dotted lines and the arrow). The speed and downward force upon the manual brake handle 10 and manual brake lever 11, particularly if the operator is holding the manual brake handle 10 and manual brake lever 11 in a raised position, could potentially injure the operator (not shown).

Figure 3:
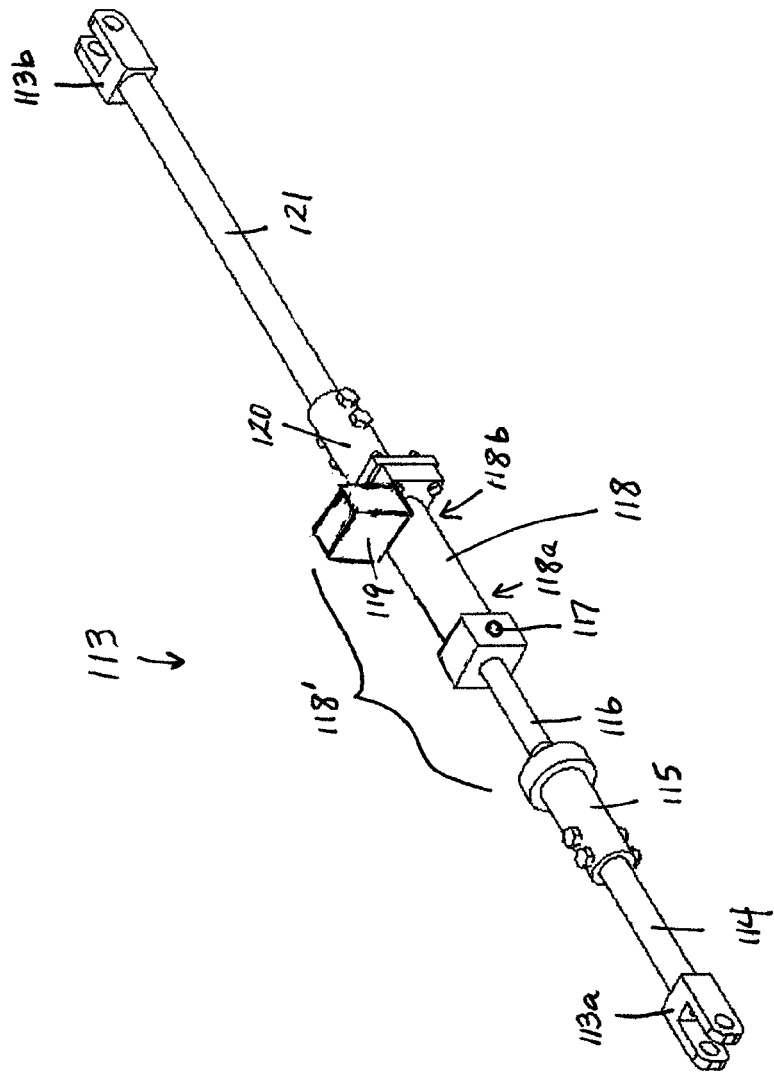
FIG. 3. Primary components of a fluid cylinder linkage assembly.

Referring now to FIG. 3, one embodiment of the presently disclosed fluid cylinder linkage assembly 113 is shown. This embodiment of a fluid cylinder linkage assembly 113 comprises a first modified connecting rod 114, one end of which is connected to a first clevis 113a and the other end of which is connected to one end of a rod end adaptor 115, a fluid cylinder 118' comprising a tube portion 118, a head end 118a comprising a breather vent 117, and a cap end 118b comprising a fluid piloted control valve 119, and a shaft or rod 116, the distal portion of which is connected to the other end of the rod end adaptor 115, a cap end adaptor 120, one end of which is connected to the cap end 118b of the fluid cylinder 118' and the other end of which is connected to one end of a second modified connecting rod 121, the other end of which is connected to a second clevis 113b. The rod end adaptor 115 and the cap end adaptor 120 can attach to a standard fluid cylinder 118', so the fluid cylinder 118' can be inserted into a modified connecting link (comprising first modified connecting rod 114 and second modified connecting rod 121), for example using bolts. The connecting link can be modified, for example, by cutting out a section and drilling bolt holes to match the rod end adaptor 115 and the cap end adaptor 120.

Figure 4:
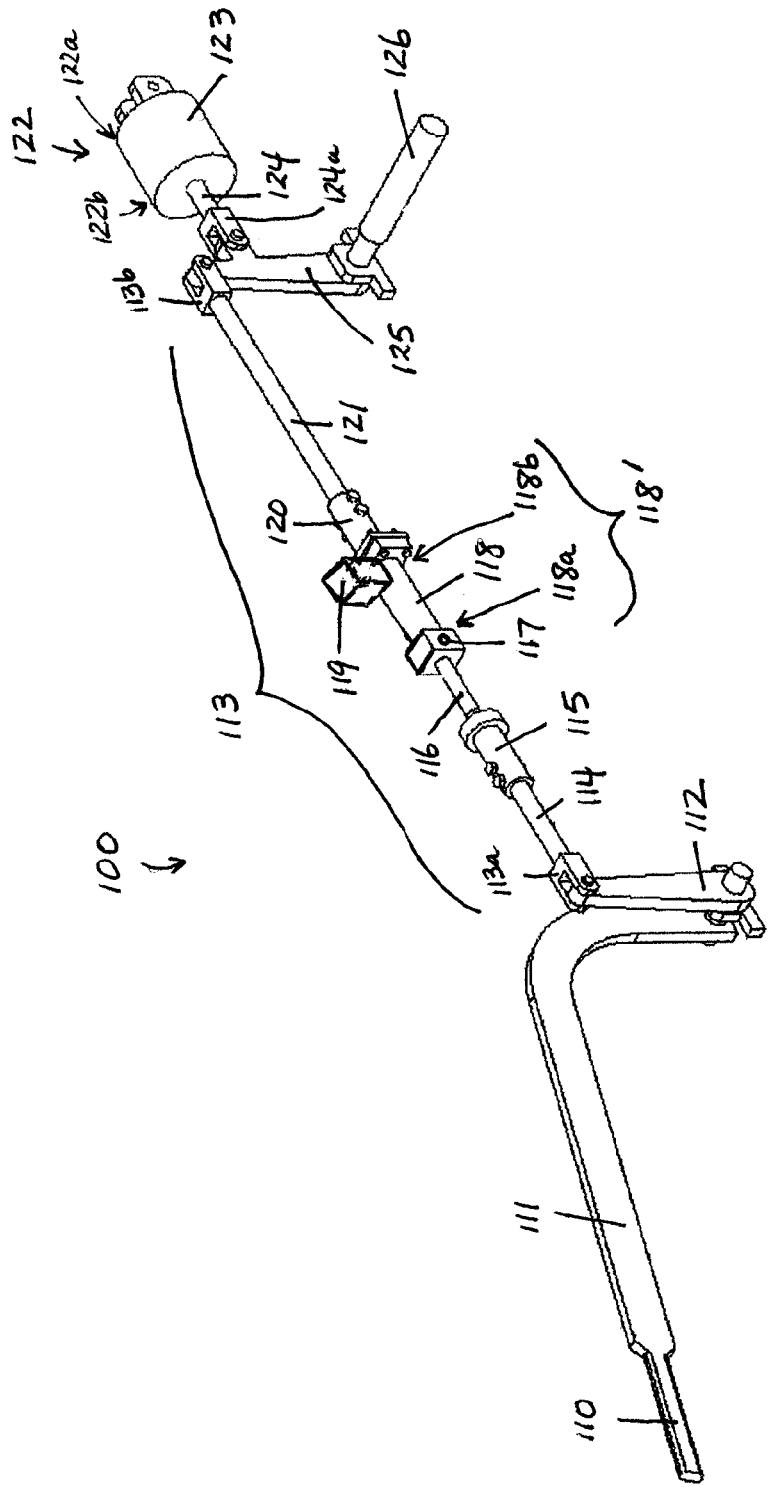
FIG. 4. Brake system comprising the fluid cylinder linkage assembly shown in FIG. 3.

Referring now to FIG. 4, one embodiment of the presently disclosed fluid cylinder linkage braking assembly 100 is shown. Braking assembly 100 comprises the embodiment of a fluid cylinder linkage assembly 113 shown in FIG. 3, which replaces the connecting rod 13 of the prior art braking assembly 1 (see FIG. 1). Thus braking assembly 100 includes a manual brake handle 110 connected to a manual brake lever 111, which is mechanically coupled to one end of a first pivot arm 112, the other end of which is mechanically coupled via a first clevis 113a to one end of the fluid cylinder linkage assembly 113, with the other end of the fluid cylinder braking assembly 113 mechanically coupled via a second clevis 113b to one end of a second pivot arm 125, the other end of which is mechanically coupled to a brake actuator shaft 126. Also shown in FIG. 4 is an emergency brake actuation cylinder 122 comprising a cap end 122a, a cylinder body 123, a head end 122b, and a shaft (or rod) 124, the distal portion of which is mechanically coupled via a third clevis 124a to the second pivot arm 125 between the second clevis 113b of the fluid cylinder linkage assembly 113 and the brake actuator shaft 126. FIG. 4 depicts a simplified, typical arrangement of components. The actuation cylinder rod 124 is mechanically coupled to the brake actuator shaft 126 and either directly or indirectly mechanically coupled to the fluid cylinder linkage assembly 113. Operation of braking assembly 100 can be performed either manually, by an operator (not shown) pushing down on the manual brake handle 110, which pushes down manual brake lever 111, which pulls first pivot arm 112, fluid cylinder linkage assembly 113, and second pivot arm 125 (to the left in FIG. 4), thereby rotating the brake actuator shaft 126 and actuating the brake (not shown), or in certain emergency situations automatically through activation of the emergency brake actuation cylinder 122, which causes shaft or rod 124 to extend, pushing the second pivot arm 125 (to the left in FIG. 4), thereby rotating the brake actuator shaft 126 and actuating the brake (not shown).

Figure 5:
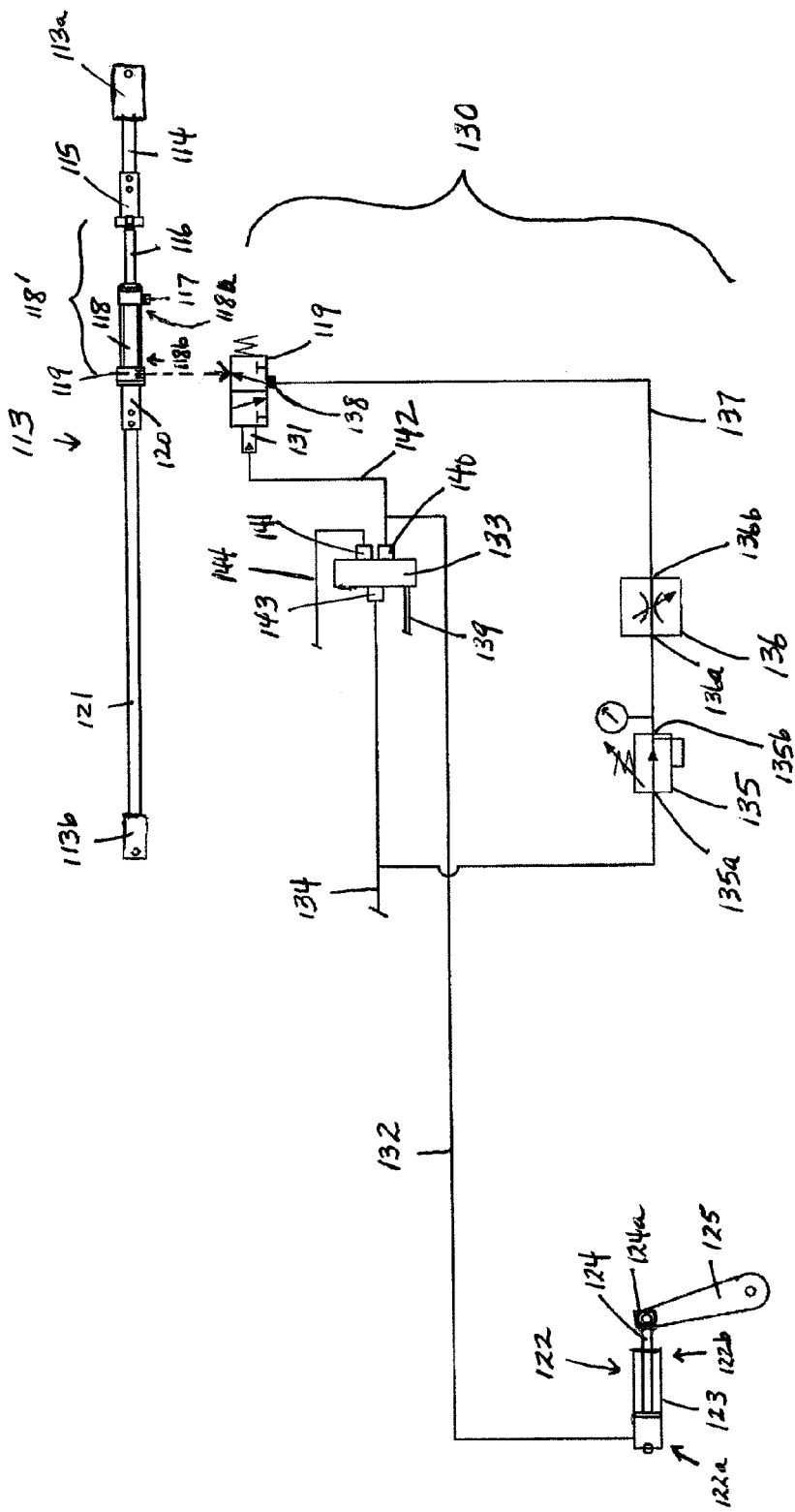
FIG. 5. Schematic view of a control system for the fluid cylinder linkage assembly shown in FIG. 3.

Referring now to FIG. 5, one embodiment of a control assembly 130 for a fluid cylinder linkage braking assembly (100 from FIG. 4) is shown. The components of the fluid cylinder linkage braking assembly shown in FIG. 5 are the embodiment of the fluid cylinder linkage assembly 113 shown in FIG. 3, along with the emergency brake actuation cylinder 122 comprising a cap end 122a, a head end 122b, a cylinder body 123 and a shaft (or rod) 124. This embodiment of a fluid cylinder linkage assembly 113 again comprises a first modified connecting rod 114, one end of which is connected to a first clevis 113a and the other end of which is connected to one end of a rod-end adaptor 115, a fluid cylinder 118' comprising a tube 118, a head end 118a comprising a breather vent 117, and a cap end 118b comprising a fluid piloted control valve 119, and a shaft or rod 116, the distal portion of which is connected to the other end of the rod end adaptor 115, a cap end adaptor 120, one end of which is connected to the cap end 118b of the fluid cylinder 118' and the other end of which is connected to one end of a second modified connecting rod 121, the other end of which is connected to a second clevis 113b. For ease of viewing, FIG. 5 shows an enlarged version of the fluid piloted control valve 119 removed from the cap end 118b of the fluid cylinder 118' (represented by dotted line in FIG. 5). Control system 130 comprises the fluid piloted control valve 119, which comprises a vent (not shown), a pilot port 131, which is in fluid communication via fluid line 142 to a first outlet port 140 of an emergency brake control valve 133, and an inlet port 138, which is connected to the fluid supply line 137 from the outlet port 136b of a flow control valve 136, the inlet port of which (136a) is connected to the outlet port 135b of a fluid pressure regulator 135, the inlet port of which (135a) is connected to a rig fluid supply line 134, which is also connected to an inlet port 143 of the emergency brake control valve 133. One end of fluid line 132 is connected to a cap end 122a of the emergency brake actuation cylinder 122, while the other end of fluid line 132 is connected to first outlet port 140 of the emergency brake control valve. Also shown on the emergency brake control valve 133 is vent 139 and second outlet port 141, which is in fluid communication via fluid line 144 to the clutch (not shown).

Figure 6A:
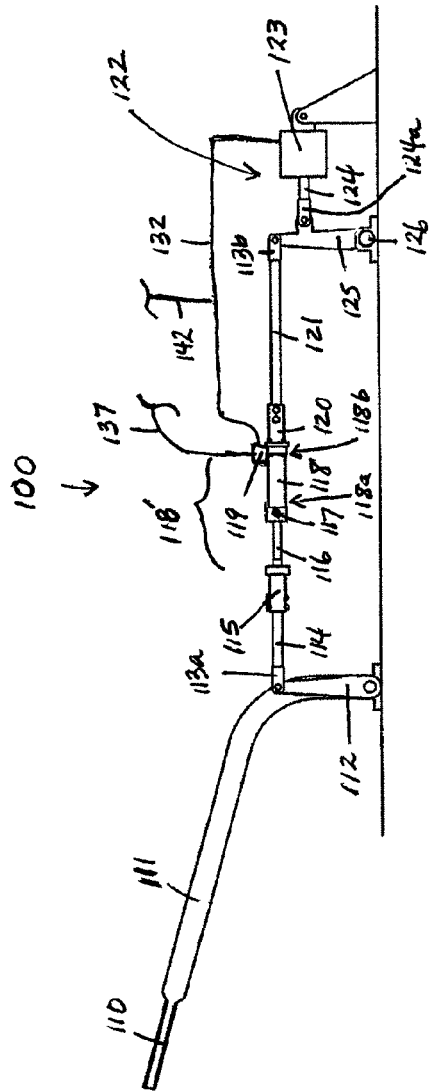
FIG. 6A and FIG. 6B. Positions of brake system comprising a fluid cylinder linkage assembly shown in FIG. 3 under normal operating conditions (FIG. 6A) and upon activation of emergency brake actuation cylinder (FIG. 6B).

Referring now to FIG. 6A, shown is the position of the fluid cylinder linkage braking assembly 100 shown in FIG. 4 under normal operating conditions. As discussed above, under normal operating conditions the manual brake handle 110 and manual brake lever 111 are in a normal position, although under certain normal operating conditions the operator (not shown) may actually raise the manual brake handle 110 and the manual brake lever 111 in order to lessen the effect of the down force of the manual brake handle 110 and the manual brake lever 111 on the brake actuator shaft 126. Under normal operating conditions the flow control valve (not shown) supplies fluid through fluid supply line 137 to the cap end 118b of the fluid cylinder 118', holding the shaft or rod 116 fully extended, so the fluid cylinder 118' functions as a solid push-pull linkage. Braking is accomplished by an operator (not shown) pushing down on the manual brake handle 110 and the manual brake lever 111.

Figure 6B:
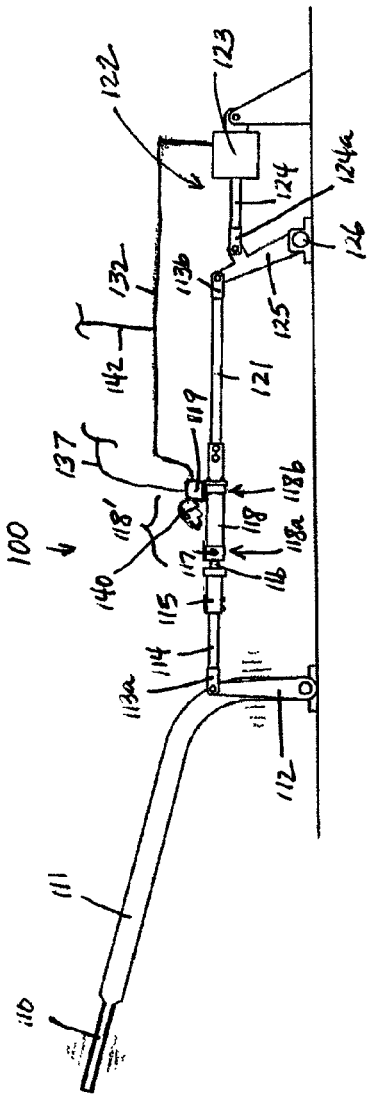

Referring now to FIG. 6B, when the emergency brake actuation cylinder 122 is activated, the pilot port (not shown; see FIG. 5) of the fluid piloted control valve 119 is pressurized through outlet line 142 from the emergency brake control valve (not shown), opening the fluid piloted control valve 119 and allowing fluid to escape (represented by cloud 140) from the cap end 118b of the fluid cylinder 118'. As the emergency brake actuation cylinder 122 pushes the shaft or rod 124 the shaft or rod 116 of the fluid cylinder 118' is pushed back into the head portion 118 of the fluid cylinder 118', preventing the force from the extension of the shaft or rod 124 of the emergency brake actuation cylinder 122 from being transferred into the manual brake lever 111 and manual brake handle 110, which remain in the normal position. When the emergency brake actuation cylinder 122 is reset, the fluid supply is cut from the emergency brake actuation cylinder 122 and the pilot port (not shown; see FIG. 5) of the fluid piloted control valve 119, which shifts back to its normal position, pressurizing the cap end 118b of the fluid cylinder 118'. The fluid pressure regulator (not shown; see FIG. 5) allows the fluid pressure supplied to the cap end 118b of the fluid cylinder 118' to be just high enough for the shaft or rod 116 of the fluid cylinder 118' to be fully extended under normal operating conditions, but low enough that the fluid from the cap end 118b of the fluid cylinder 118' escapes quickly when the emergency brake actuation cylinder is activated. The flow control valve (not shown; see FIG. 5) regulates the fluid flow into the cap end 118b of the fluid cylinder 118' so that is fills slowly when the system is started or the emergency brake actuation cylinder is reset, preventing abrupt movement of the shaft or rod 116 of the fluid cylinder 118' thereby preventing abrupt movement of the manual brake lever 111 and manual brake handle 110, which could potentially injure the operator (not shown).

Referring now to FIG. 7, another embodiment of the presently disclosed fluid cylinder linkage assembly 213 is shown. This embodiment of a fluid cylinder linkage assembly 213 comprises a first modified connecting rod 214, one end of which is connected to a first clevis 213a and the other end of which is connected to one end of a rod end adaptor 215, a fluid cylinder 218' comprising a tube portion 218, a head end 218a, a cap end 218b, and a shaft or rod 216, the distal portion of which is connected to the other end of the rod end adaptor 215, a cap end adaptor 220, one end of which is connected to the cap end 218b of the fluid cylinder 218' and the other end of which is connected to one end of a second modified connecting rod 221, the other end of which is connected to a second clevis 213b. Also shown in FIG. 7 is a fluid piloted control valve 219, which is in fluid communication via fluid line 219a to the head end 218a of the fluid cylinder 218', and via fluid line 219b to the cap end 218a of the fluid cylinder 218'. The rod end adaptor 215 and the cap end adaptor 220 can attach to a standard fluid cylinder 218', so the fluid cylinder 218' can be inserted into a modified connecting link (comprising first modified connecting rod 214 and second modified connecting rod 221), for example using bolts. The connecting link can be modified, for example, by cutting out a section and drilling bolt holes to match the rod end adaptor 215 and the cap end adaptor 220.

Figure 8:
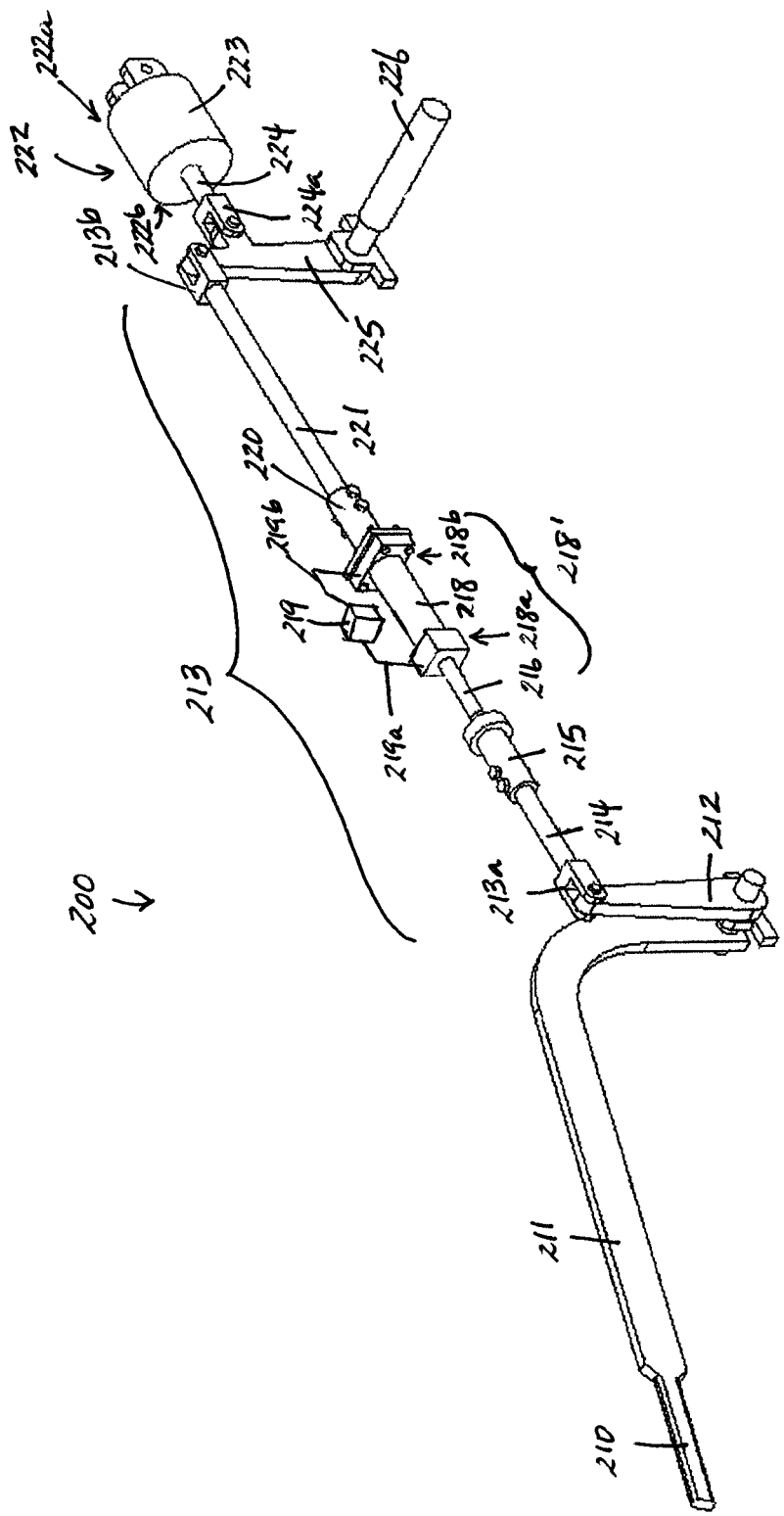
FIG. 8. Brake system comprising the alternate embodiment of a fluid cylinder linkage assembly shown in FIG. 7.

Referring now to FIG. 8, an alternate embodiment of the presently disclosed fluid cylinder linkage braking assembly 200 is shown. Braking assembly 200 comprises the embodiment of a fluid cylinder linkage assembly 213 shown in FIG. 7, which replaces the connecting rod 13 of the prior art braking assembly 1 (see FIG. 1). Thus braking assembly 200 includes a manual brake handle 210 connected to a manual brake lever 211, which is mechanically coupled to one end of a first pivot arm 212, the other end of which is mechanically coupled via a first clevis 213a to one end of the fluid cylinder linkage assembly 213, with the other end of the fluid cylinder braking assembly 213 mechanically coupled via a second clevis 213b to one end of a second pivot arm 225, the other end of which is mechanically coupled to a brake actuator shaft 226. Also shown in FIG. 8 is an emergency brake actuation cylinder 222 comprising a cap end 222a, a cylinder body 223, a head end 222b, and a shaft (or rod) 224, the distal portion of which is mechanically coupled via a third clevis 224a to the second pivot arm 225 between the second clevis 213b of the fluid cylinder linkage assembly 213 and the brake actuator shaft 226. FIG. 8 depicts a simplified, typical arrangement of components. The actuation cylinder rod 224 is mechanically coupled to the brake actuator shaft 226 and either directly or indirectly mechanically coupled to the fluid cylinder linkage assembly 213. Operation of braking assembly 200 can be performed either manually, by an operator (not shown) pushing down on the manual brake handle 210, which pushes down manual brake lever 211, which pulls first pivot arm 212, fluid cylinder linkage assembly 213, and second pivot arm 225 (to the left in FIG. 8), thereby rotating the brake actuator shaft 226 and actuating the brake (not shown), or in certain emergency situations automatically through activation of the emergency brake actuation cylinder 222, which causes shaft or rod 224 to extend, pushing the second pivot arm 225 (to the left in FIG. 8), thereby rotating the brake actuator shaft 226 and actuating the brake (not shown).

Figure 9:
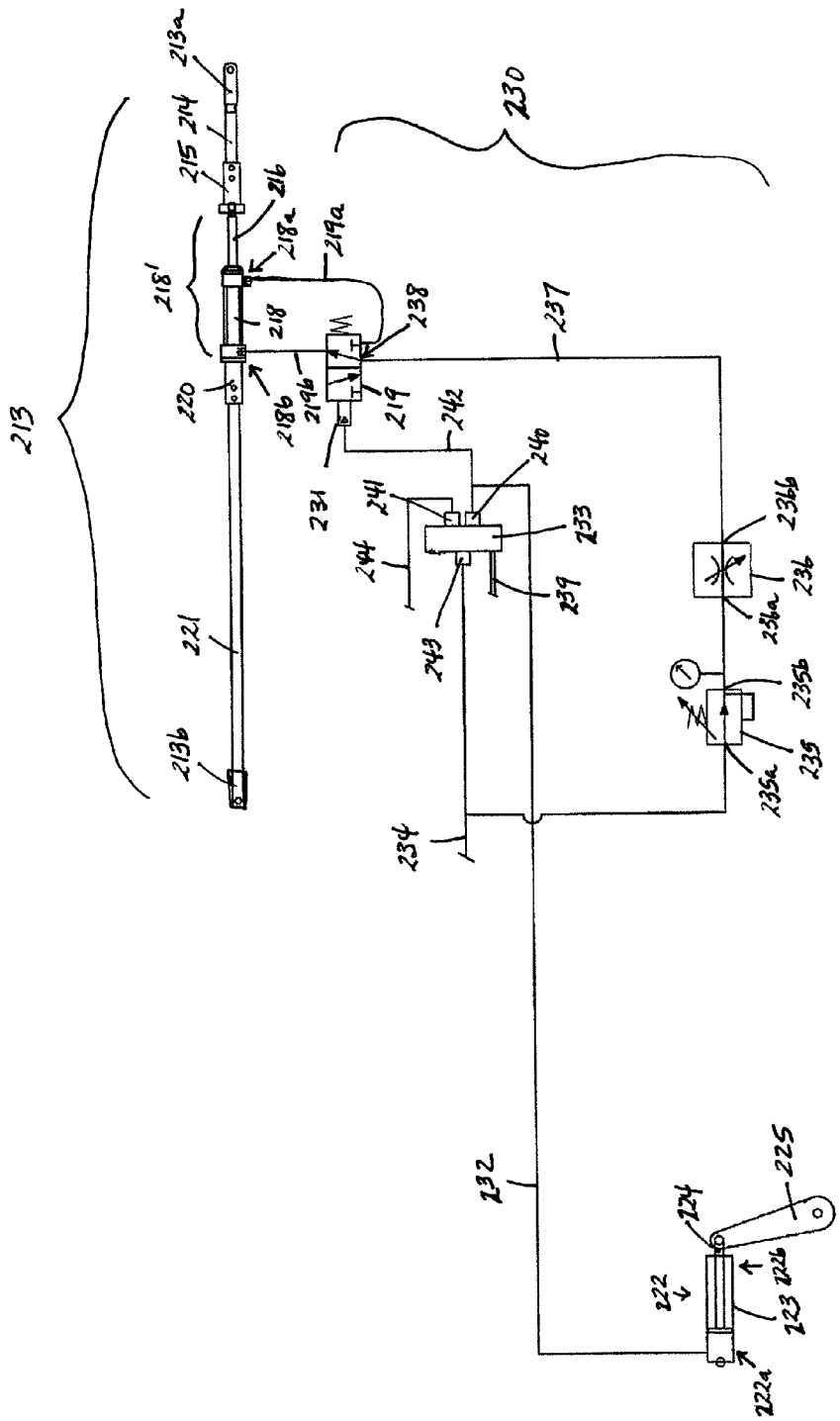
FIG. 9. Schematic view of a control system of the alternate embodiment of a fluid cylinder linkage assembly shown in FIG. 7.

Referring now to FIG. 9, an alternate embodiment of a control assembly 230 for a fluid cylinder linkage braking assembly (200 from FIG. 8) is shown. The components of the fluid cylinder linkage braking assembly shown in FIG. 9 are the embodiment of the fluid cylinder linkage assembly 213 shown in FIG. 7, along with the emergency brake actuation cylinder 222 comprising a cap end 222a, a head end 222b, a cylinder body 223 and a shaft (or rod) 224. This embodiment of a fluid cylinder linkage assembly 213 again comprises a first modified connecting rod 214, one end of which is connected to a first clevis 213a and the other end of which is connected to one end of a rod-end adaptor 215, a fluid cylinder 218' comprising a tube 218, a head end 218a, a cap end 218b, and a shaft or rod 216, the distal portion of which is connected to the other end of the rod end adaptor 215, a cap end adaptor 220, one end of which is connected to the cap end 218b of the fluid cylinder 218' and the other end of which is connected to one end of a second modified connecting rod 221, the other end of which is connected to a second clevis 213b. FIG. 9 also shows a fluid piloted control valve 219, which is connected to the cap end 218b of the fluid cylinder 218' via fluid line 219b, and to the head end 218a of the fluid cylinder 218' via fluid line 219a. Control system 230 comprises the fluid piloted control valve 219, which comprises a pilot port 231, which is in fluid communication via fluid line 242 to a first outlet port 240 of an emergency brake control valve 233, and an inlet port 238, which is connected to the fluid supply line 237 from the outlet port 236b of a flow control valve 236, the inlet port of which (236a) is connected to the outlet port 235b of a fluid pressure regulator 235, the inlet port of which (235a) is connected to a rig fluid supply line 234, which is also connected to an inlet port 243 of the emergency brake control valve 233. One end of fluid line 232 is connected to a cap end 222a of the emergency brake actuation cylinder 222, while the other end of fluid line 232 is connected to first outlet port 240 of the emergency brake control valve. Also shown on the emergency brake control valve 233 is vent 239 and second outlet port 241, which is in fluid communication via fluid line 244 to the clutch (not shown).

Referring now to FIG. 10A, shown is the position of the fluid cylinder linkage braking assembly 200 shown in FIG. 8 under normal operating conditions. As discussed above, under normal operating conditions the manual brake handle 210 and manual brake lever 211 are in a normal position, although under certain normal operating conditions the operator (not shown) may actually raise the manual brake handle 210 and the manual brake lever 211 in order to lessen the effect of the down force of the manual brake handle 210 and the manual brake lever 211 on the brake actuator shaft 226. Under normal operating conditions the flow control valve (not shown) supplies fluid through fluid supply line 237 to the fluid piloted control valve 219, and then through fluid line 219b to the cap end 218b of the fluid cylinder 218', holding the shaft or rod 216 fully extended, so the fluid cylinder 218' functions as a solid push-pull linkage. Braking is accomplished by an operator (not shown) pushing down on the manual brake handle 210 and the manual brake lever 211.

Referring now to FIG. 10B, when the emergency brake actuation cylinder 222 is activated, the pilot port (not shown; see FIG. 9) of the fluid piloted control valve 219 is pressurized through outlet line 242 from the emergency brake control valve (not shown) opening the fluid piloted control valve 219, allowing fluid to move from the cap end 218b of the fluid cylinder 218' to the head end 218a of the fluid cylinder 218'. As the emergency brake actuation cylinder 222 pushes (extends) the shaft or rod 224, the shaft or rod 216 of the fluid cylinder 218' is pushed back into the fluid cylinder 218', preventing the force from the extension of the shaft or rod 224 of the emergency brake actuation cylinder 222 from being transferred into the manual brake lever 211 and manual brake handle 210, which remain in the normal position. When the emergency brake actuation cylinder 222 is reset, the fluid supply is cut from the emergency brake actuation cylinder 222 and the pilot port (not shown; see FIG. 9) of the fluid piloted control valve 219, which shifts back to its normal position, pressurizing the cap end 218*b* of the fluid cylinder 218'. The fluid pressure regulator (not shown; see FIG. 9) allows the fluid pressure supplied to the cap end 218*b* of the fluid cylinder 218' to be just high enough for the shaft or rod 216 of the fluid cylinder 218' to be fully extended under normal operating conditions, but low enough that the fluid from the cap end 218*b* of the fluid cylinder 218' escapes quickly when the emergency brake actuation cylinder is activated. The flow control valve (not shown; see FIG. 9) regulates the fluid flow into the cap end 218*b* of the fluid cylinder 218' so that is fills slowly when the system is started or the emergency brake actuation cylinder is reset, preventing abrupt movement of the shaft or rod 216 of the fluid cylinder 218' thereby preventing abrupt movement of the manual brake lever 211 and manual brake handle 210, which could potentially injure the operator (not shown).

Referring now to FIG. 11A, an alternate embodiment of a fluid cylinder linkage assembly 350 is shown. This embodiment of a fluid cylinder linkage assembly 350 comprises a manual brake lever 352, one end of which is connected to a manual brake handle 351, and the other end of which is attached to a pivot arm 359. The pivot arm 359 is also connected to a head end 356 of a fluid cylinder 353 comprising a tube portion 355, a cap end 354, which is connected to a fluid piloted control valve (not shown; see FIG. 11B and FIG. 11C), and a shaft or rod 357, the distal portion of which is connected a pivot arm 358, forming a four-bar link arrangement.

Referring now to FIG. 11B, another embodiment of a presently disclosed fluid cylinder linkage braking assembly 300 under normal operating conditions is shown. Braking assembly 300 comprises the embodiment of a fluid cylinder linkage assembly 350 shown in FIG. 11A, which replaces the manual brake handle 10, manual brake lever 11, and pivot arm 12 of the prior art braking assembly 1 (see FIG. 1). Thus braking assembly 300 includes a manual brake handle 351 connected to a manual brake lever 352, which is attached to a pivot arm 359. The pivot arm 359 is also connected to a head end (not visible is this drawing) of a fluid cylinder 353 comprising a tube portion 355, a cap end 354, which is in fluid communication via fluid line 367 with a fluid piloted control valve 365, and a shaft or rod 357, the distal portion of which is connected a pivot arm 358, forming a four-bar link arrangement. The pivot arm 358 is connected to one end of a connecting rod 360, the other end of which is connected to one end of a second pivot arm 361, the other end of which is mechanically coupled to a brake actuator shaft 362. Also shown in FIG. 11B is an emergency brake actuation cylinder 363 comprising a cap end 363*a*, a head end 363*b*, a cylinder body 364 and a shaft (or rod) 368, the distal portion of which is mechanically coupled to the second pivot arm 361. The cap end 363*a* of the emergency brake actuation cylinder 363 is in fluid communication via fluid line 366 with a pilot port 365*a* of a fluid piloted control valve 365, which is in fluid communication via fluid line 367 with the cap end 354 of fluid cylinder 353. Cap end 354 of fluid cylinder 353 can be recharged by manual valve 370 via fluid line 369. In normal operation rod 357 of fluid cylinder 353 is fully extended, such that the brake can be applied by an operator (not shown) pushing down on the brake lever 352 which pulls pivot arm 358, connecting rod 360, and second pivot arm 361 (to the right in FIG. 11B), thereby rotating the brake actuator shaft 362 clockwise (as depicted) and actuating the brake (not shown), and the brake can be released by an operator (not shown) pushing up on the brake lever 352 which pushes pivot arm 358, connecting rod 360, and second pivot arm 361 (to the left in FIG. 11B), thereby rotating the brake actuator shaft 362 counterclockwise (as depicted) and releasing the brake (not shown).

Referring now to FIG. 11C, presently disclosed fluid cylinder linkage braking assembly 300 is shown upon actuation of emergency brake actuation cylinder 363. Actuation of emergency brake actuation cylinder 363 causes shaft (or rod) 368 to fully extend, which pushes the second pivot arm 361 (to the right in FIG. 11C), thereby rotating the brake actuator shaft 362 (clockwise as depicted) and actuating the brake (not shown). The movement of second pivot arm 361 also forces connecting rod 360 and pivot arm 358 to shift to the right, however, actuation of the emergency brake actuation cylinder also causes the fluid piloted control valve 365 to vent the cap side 354 of fluid cylinder 353 (represented by cloud 371), allowing rod (not visible in this drawing) to move into tube portion 355 of fluid cylinder 353, thereby preventing downward movement of manual brake lever 352.

Referring now to FIG. 12A, another embodiment of a presently disclosed fluid cylinder linkage braking assembly 400 under normal operating conditions is shown. Braking assembly 400 comprises the embodiment of a fluid cylinder linkage assembly 350 shown in FIG. 11A, which replaces the manual brake handle 10, manual brake lever 11, and pivot arm 12 of the prior art braking assembly 1 (see FIG. 1). Thus braking assembly 400 includes a manual brake handle 351 connected to a manual brake lever 352, which is attached to a pivot arm 359. The pivot arm 359 is also connected to a head end (not visible is this drawing) of a fluid cylinder 353 comprising a tube portion 355, a cap end 354, which is in fluid communication via fluid line 367 with a fluid piloted control valve 365, and a shaft or rod 357, the distal portion of which is connected a pivot arm 358, forming a four-bar link arrangement. In braking assembly 400, the head end (not visible in this drawing) of the fluid cylinder 353 is in fluid communication via fluid line 372 to the fluid piloted control valve 365. The pivot arm 358 is connected to one end of a connecting rod 360, the other end of which is connected to one end of a second pivot arm 361, the other end of which is mechanically coupled to a brake actuator shaft 362. Also shown in FIG. 12A is an emergency brake actuation cylinder 363 comprising a cap end 363*a*, a head end 363*b*, a cylinder body 364 and a shaft (or rod) 368, the distal portion of which is mechanically coupled to the second pivot arm 361. The cap end 363*a* of the emergency brake actuation cylinder 363 is in fluid communication via fluid line 366 with a pilot port 365*a* of a fluid piloted control valve 365, which is in fluid communication via fluid line 367 with the cap end 354 of fluid cylinder 353. Cap end 354 of fluid cylinder 353 can be recharged by manual valve 370 via fluid line 369. In normal operation rod 357 of fluid cylinder 353 is fully extended, such that the brake can be applied by an operator (not shown) pushing down on the brake lever 352 which pulls pivot arm 358, connecting rod 360, and second pivot arm 361 (to the right in FIG. 12A), thereby rotating the brake actuator shaft 362 clockwise (as depicted) and actuating the brake (not shown), and the brake can be released by an operator (not shown) pushing up on the brake lever 352 which pushes pivot arm 358, connecting rod 360, and second pivot arm 361 (to the left in FIG. 12A), thereby rotating the brake actuator shaft 362 counterclockwise (as depicted) and releasing the brake (not shown).

Referring now to FIG. 12B, presently disclosed fluid cylinder linkage braking assembly 400 is shown upon actuation of emergency brake actuation cylinder 363. Actuation of emergency brake actuation cylinder 363 causes shaft (or rod) 368 to fully extend, which pushes the second pivot arm 361

(to the right in FIG. 12B), thereby rotating the brake actuator shaft 362 (clockwise as depicted) and actuating the brake (not shown). The movement of second pivot arm 361 also forces connecting rod 360 and pivot arm 358 to shift to the right, however, actuation of the emergency brake actuation cylinder also causes the fluid piloted control valve 365 to vent the cap end 354 of fluid cylinder 353 to the head end (not visible in this drawing) via fluid line 372, allowing rod (not visible in this drawing) to move into tube portion 355 of fluid cylinder 353, thereby preventing downward movement of manual brake lever 352.

Referring now to FIG. 13A, an embodiment of a presently disclosed rotary fluid cylinder linkage assembly 500 under normal operating conditions is shown. Assembly 500 can be installed in any section of a rotating brake linkage. Assembly 500 includes a manual brake handle 501 connected to a manual brake lever 502, which is attached to a pinion shaft 503 of a rotary actuator 504, which comprises pistons 505a and 505b and rack 506. Also shown in FIG. 13A is a fluid piloted control valve 507, which is in fluid communication via fluid line 512 with one end of the rotary actuator 504. Fluid piloted control valve also comprises pilot port 508, which is in fluid communication via fluid line 509 to an outlet port (not shown) of an emergency brake control valve (not shown), and is also in fluid communication via fluid line 510 to a rig fluid supply (not shown). In normal operation pistons 505a and 505b of rotary actuator 504 are fully extended by the rig fluid supply (to the right in FIG. 13A), such that an operator (not shown) pushing the brake lever 502 down to actuate the brake (not shown) causes rotation of the rotary actuator 504.

Referring now to FIG. 13B, presently disclosed rotary fluid cylinder linkage assembly 500 is shown upon actuation of emergency brake actuation cylinder (not shown). Actuation of emergency brake actuation cylinder (not shown) causes fluid to pass through fluid line 509 and enter the fluid piloted control valve 507 via pilot port 508, which allows rotary actuator 504 to vent (represented by cloud 511), thereby causing pistons 505a and 505b of the rotary actuator 504 to retract (to the left in FIG. 13B), disengaging the rotation of the rotary actuator 504 and the movement of the manual brake lever 502, thereby preventing downward movement of manual brake lever 502.

Figure 14A:
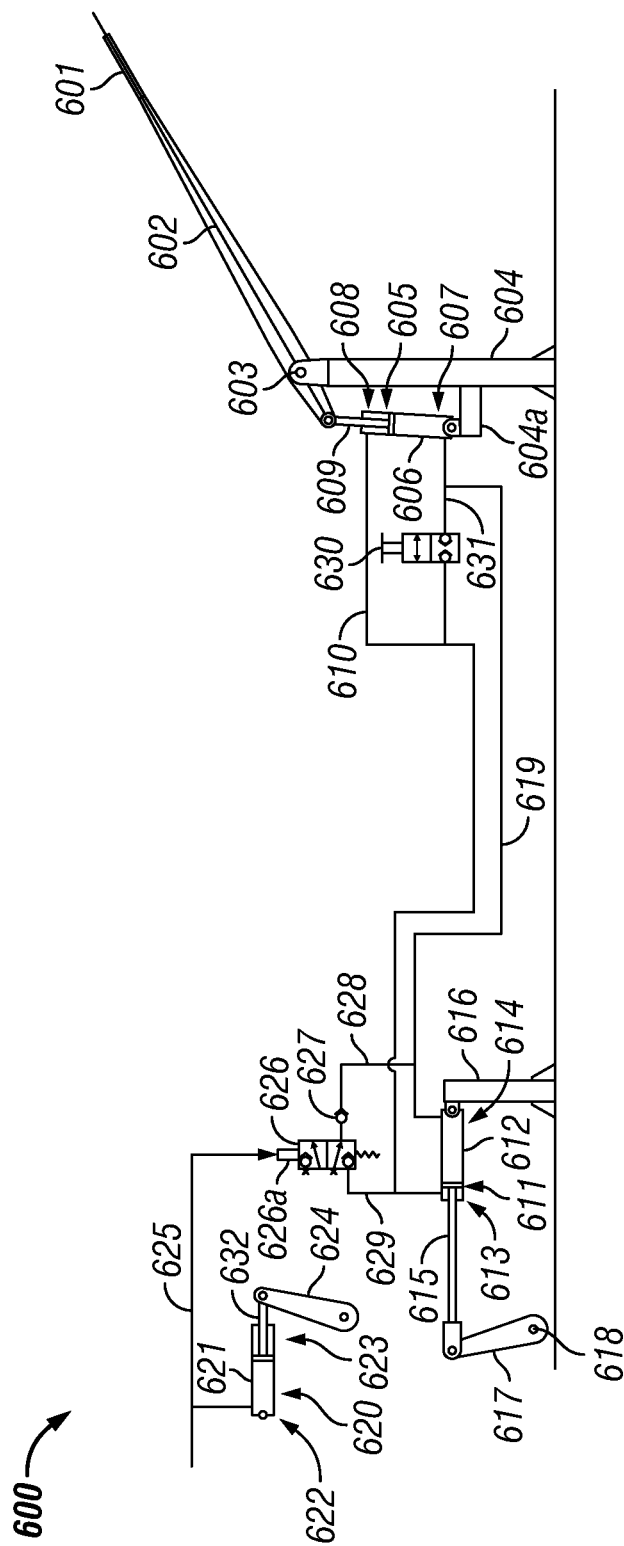
FIG. 14A, FIG. 14B, and FIG. 14C. Alternate embodiment of a fluid cylinder hydraulic linkage brake system under normal operating conditions (FIG. 14A), under manual braking conditions (FIG. 14B), and under emergency braking conditions (FIG. 14C).

Referring now to FIG. 14A, an embodiment of a presently disclosed fluid cylinder hydraulic linkage braking assembly 600 under normal operating conditions is shown. Thus braking assembly 600 includes a manual brake handle 601 connected to a manual brake lever 602, which is attached to a stand 604 via pivot joint 603. The stand 604 also comprises mount 604a, which is connected to the cap end 607 of a fluid cylinder 605. Fluid cylinder 605 also comprises a tube portion 606, a head end 608, and a shaft or rod 609, the distal portion of which is connected an end of the manual brake lever 602 that is opposite the manual brake handle 601. The head end 608 of fluid cylinder 605 is in fluid communication via fluid line 610 to the head end 613 of brake cylinder 611, and the cap end 607 of fluid cylinder 605 is in fluid communication via fluid line 619 to the cap end 614 of brake cylinder 611. Brake cylinder 611 also comprises tube portion 612 and rod or shaft 615, the distal portion of which is connected to a pivot arm 617, the other end of which is mechanically coupled to a brake actuator shaft 618. Also shown in FIG. 14A is an emergency brake actuation cylinder 620 comprising a cap end 622, a head end 623, a tube portion 621 and a shaft (or rod) 632, the distal portion of which is mechanically coupled to the second pivot arm 624. The cap end 622 of the emergency brake actuation cylinder 620 is in fluid communication via fluid line 625 with a pilot port 626a of a fluid piloted control valve 626, which is in fluid communication via fluid line 629 with the head end 613 of brake cylinder 611. The fluid piloted control valve 626 is also in fluid communication via fluid line 628 to one-way check valve 627 and cap end 614 of brake cylinder 611. In normal operation rod 609 of fluid cylinder 605 is depressed into the tube portion 606 of the fluid cylinder 605, thereby forcing fluid through fluid line 619 to the cap end 614 of the brake cylinder 611, which forces rod 615 to be extended from brake cylinder 611, thereby leaving brake (not shown) disengaged.

Figure 14B:
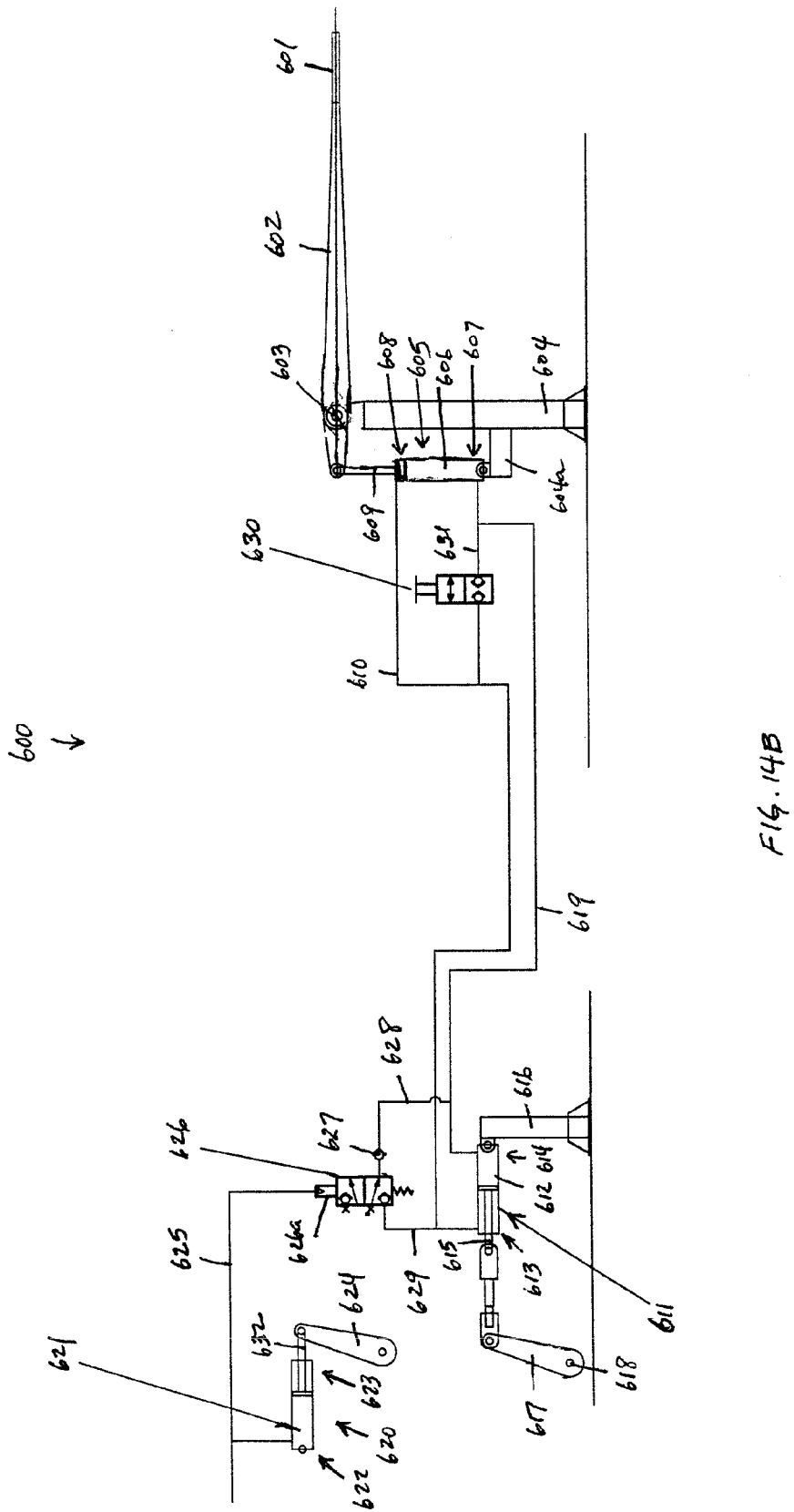

Referring now to FIG. 14B, an embodiment of a presently disclosed fluid cylinder hydraulic linkage braking assembly 600 under manual braking conditions is shown. To manually engage the brake, an operator (not shown) pushes down on the brake lever 602 which pulls rod 609, out of tube portion 606 of fluid cylinder 605, thereby forcing fluid through fluid line 610 to the head end 613 of brake cylinder 611, which forces rod 615 into tube portion 612 of brake cylinder 611, which causes second pivot arm 617 to rotate (to the right in FIG. 14B), thereby rotating the brake actuator shaft 618 clockwise (as depicted) and actuating the brake (not shown). The brake can be released by an operator (not shown) pushing up on the brake lever 602, which reverses this process, thereby rotating the brake actuator shaft 618 counterclockwise (as depicted) and releasing the brake (not shown). Cap end 607 of fluid cylinder 605 can be recharged by manual valve 630 via fluid line 631.

Figure 14C:
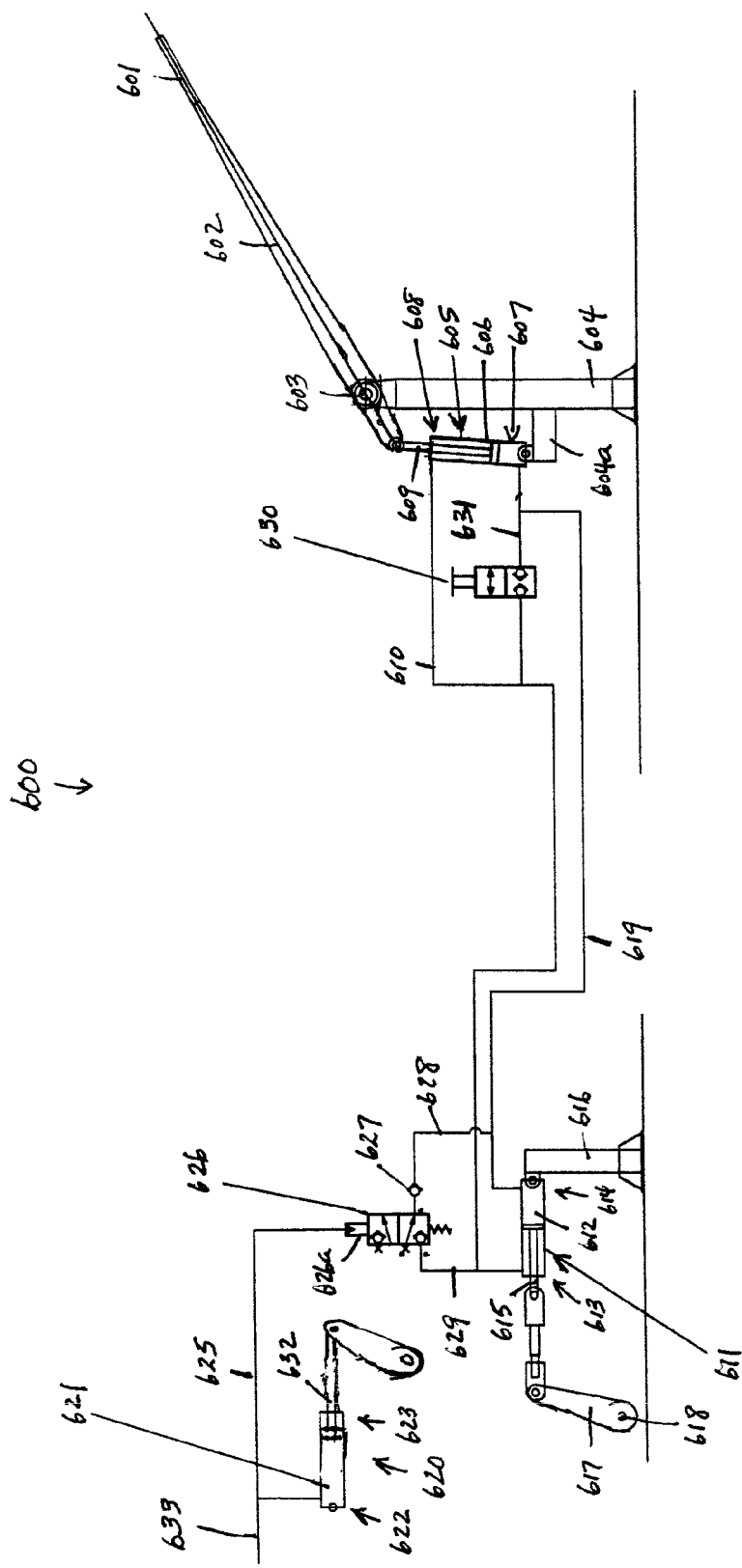

Referring now to FIG. 14C, presently disclosed fluid cylinder hydraulic linkage braking assembly 600 is shown upon actuation of emergency brake actuation cylinder 620. When the emergency brake actuation cylinder 620 is activated, the pilot port 626a of the fluid piloted control valve 626 is pressurized through outlet line 633 from the emergency brake control valve (not shown) opening the fluid piloted control valve 626, allowing fluid to move through fluid line 629 to the head end 613 of the brake cylinder 611, which allows second pivot arm 617 to rotate (to the right in FIG. 14C), as the emergency brake 620 rotates the brake actuator shaft 618 clockwise (as depicted) and actuating the brake (not shown). However, since the control valve 626 allows fluid to pass from the cap end 614 of the brake cylinder 611 to the head end 613 of the brake cylinder 611, preventing fluid from passing through fluid line 619 into cap end 607 of fluid cylinder 605, thereby maintaining the manual brake lever 602 and manual brake handle 601 in the normal position. The check valve 627 prevents fluid from flowing from fluid line 629 to fluid line 628, regardless of the position of the control valve 626, so fluid cannot directly flow from the head end 613 of the brake cylinder 611 to the cap end 614 of the brake cylinder 611, so pushing down on the brake handle 601 will cause the brake cylinder rod 615 to retract into the cylinder, rotating the pivot arm 617 clockwise, actuating the brake (not shown).

Figure 15A:
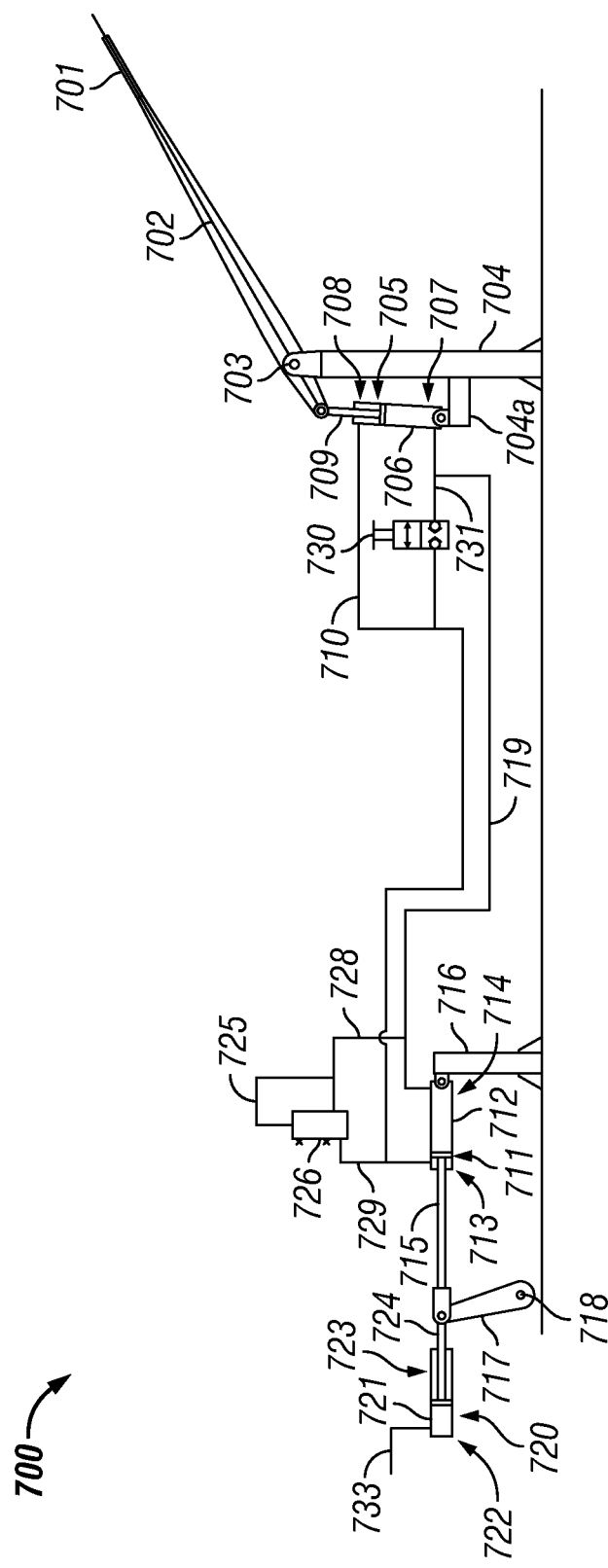
FIG. 15A, FIG. 15B, and FIG. 15C. Alternate embodiment of a fluid cylinder hydraulic linkage brake system under normal operating conditions (FIG. 15A), under manual braking conditions (FIG. 15B), and under emergency braking conditions (FIG. 15C).

Referring now to FIG. 15A, an alternate embodiment of a presently disclosed fluid cylinder hydraulic linkage braking assembly 700 under normal operating conditions is shown. Thus braking assembly 700 includes a manual brake handle 701 connected to a manual brake lever 702, which is attached to a stand 704 via pivot joint 703. The stand 704 also comprises mount 704a, which is connected to the cap end 707 of a fluid cylinder 705. Fluid cylinder 705 also comprises a tube portion 706, a head end 708, and a shaft or rod 709, the distal portion of which is connected an end of the manual brake lever 702 that is opposite the manual brake handle 701. The head end 708 of fluid cylinder 705 is in fluid communication via fluid line 710 to the head end 713 of brake cylinder 711, and the cap end 707 of fluid cylinder 705 is in fluid communication via fluid line 719 to the cap end 714 of brake cylinder 711. Brake cylinder 711 also comprises tube portion 712 and rod or shaft 715, the distal portion of which is connected to a pivot arm 717, the other end of which is mechanically coupled to a brake actuator shaft 718. Also shown in FIG. 15A is an emergency brake actuation cylinder 720 comprising a cap end 722, a head end 723, a tube portion 721 and a shaft (or rod) 724, the distal portion of which is mechanically coupled to the pivot arm 717. The relief valve 726 is in fluid communication via fluid line 725 with the cap end 714 of brake cylinder 711 via fluid line 728. In normal operation rod 709 of fluid cylinder 705 is depressed into the tube portion 706 of the fluid cylinder 705, thereby forcing fluid through fluid line 719 to the cap end 714 of the brake cylinder 711, which forces rod 715 to be extended from brake cylinder 711, thereby leaving brake (not shown) disengaged.

Figure 15B:
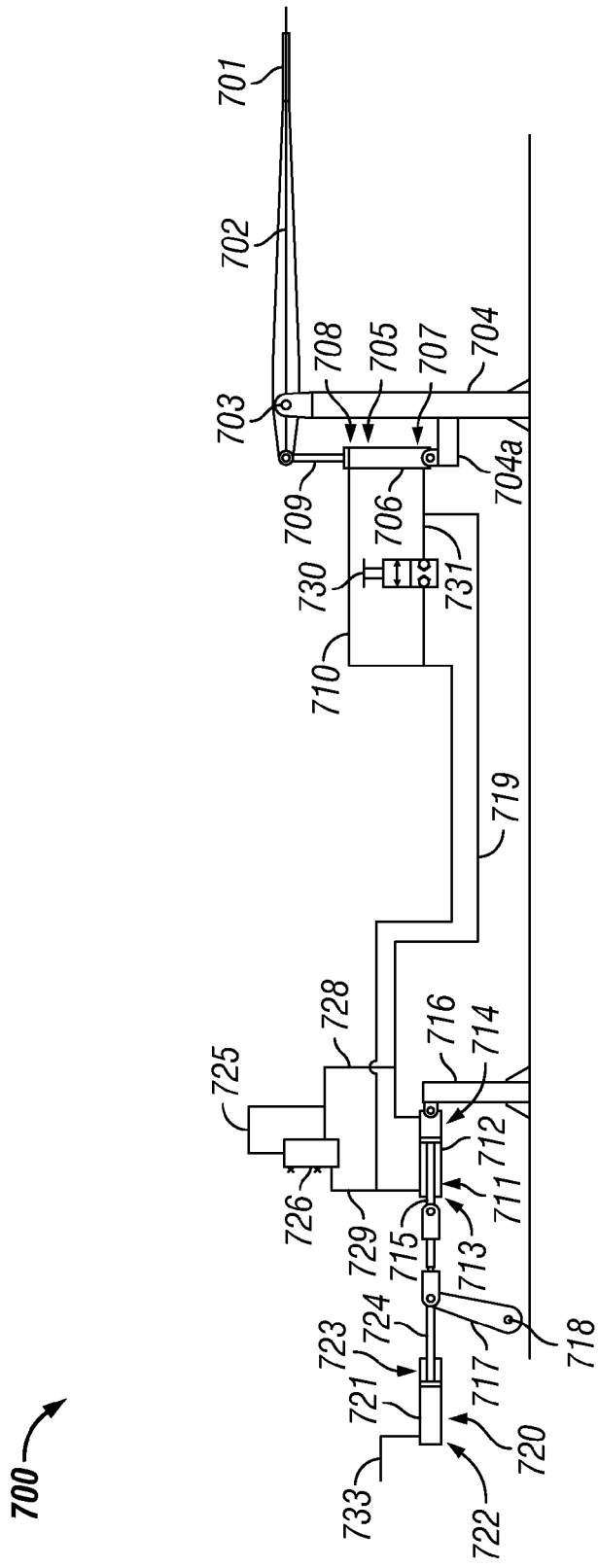

Referring now to FIG. 15B, an alternate embodiment of a presently disclosed fluid cylinder hydraulic linkage braking assembly 700 under manual braking conditions is shown. To manually engage the brake, an operator (not shown) pushes down on the brake lever 702 which pulls rod 709, out of tube portion 706 of fluid cylinder 705, thereby forcing fluid through fluid line 710 to the head end 713 of brake cylinder 711, which forces rod 715 into tube portion 712 of brake cylinder 711, which causes second pivot arm 717 to rotate (to the right in FIG. 15B), thereby rotating the brake actuator shaft 718 clockwise (as depicted) and actuating the brake (not shown). The brake can be released by an operator (not shown) pushing up on the brake lever 702, which reverses this process, thereby rotating the brake actuator shaft 718 counterclockwise (as depicted) and releasing the brake (not shown). Cap end 707 of fluid cylinder 705 can be recharged by manual valve 730 via fluid line 731.

Figure 15C:
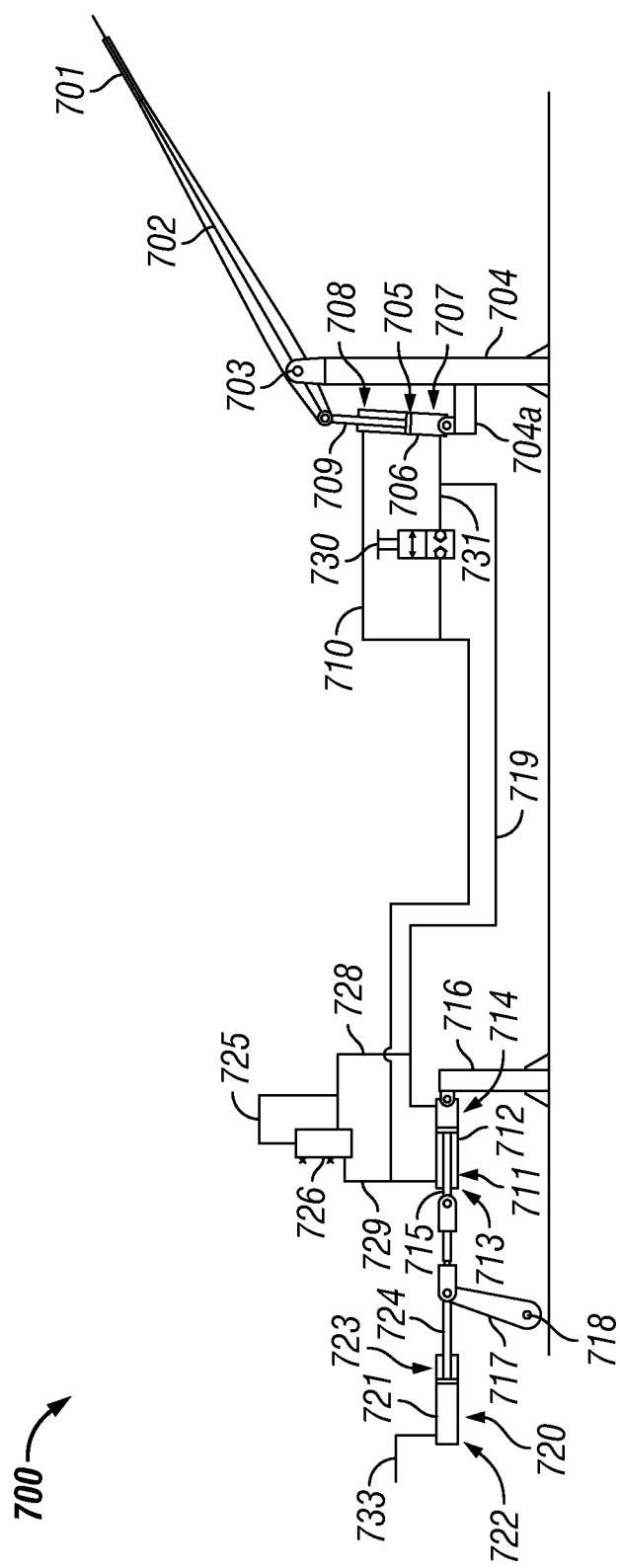

Referring now to FIG. 15C, presently disclosed fluid cylinder hydraulic linkage braking assembly 700 is shown upon actuation of emergency brake actuation cylinder 720. When the emergency brake actuation cylinder 720 is activated, shaft 724 extends, forcing pivot arm 717 to rotate (to the right in FIG. 15C), thereby rotating the brake actuator shaft 718 clockwise (as depicted) and actuating the brake (not shown). Rotation of pivot arm 717 also pushes rod 715 into the cylinder body 712, increasing pressure of the fluid in the cap end 714 of the brake cylinder 711. However, once the pressure in the relief valve 726 from the fluid passing from the cap end 714 of the brake cylinder 711 through fluid line 728 increases to the set level of the relief valve 726, relief valve 726 opens allowing fluid to pass from the cap end 714 of the brake cylinder 711 to the head end 713 of the brake cylinder 711, preventing fluid from passing through fluid line 719 into cap end 707 of fluid cylinder 705, thereby maintaining the manual brake lever 702 and manual brake handle 701 in the normal position.

Referring now to FIG. 16A, an embodiment of a presently disclosed rotary linkage assembly 800 under normal operating conditions is shown. Assembly 800 can be installed in any section of a rotating brake linkage. Assembly 800 includes a manual brake handle 801 connected to a manual brake lever 802, which is attached to a shaft 805 and a plate 807 of a clutch assembly 806, which further comprises first stop plate 803 and second stop plate 804. In normal operation plate 807 abuts first stop plate 803 and second stop plate 804 and is prevented from clockwise rotation.

Referring now to FIG. 16B, an embodiment of a presently disclosed rotary linkage assembly 800 under normal braking conditions is shown. An operator (not shown) pushes the brake handle 801 and brake lever 802 down causing clockwise (as depicted) rotation of the clutch assembly 806, thereby actuating the brake (not shown).

Referring now to FIG. 16C, an embodiment of the presently disclosed rotary linkage assembly 800 is shown upon actuation of emergency brake actuation cylinder (not shown). Actuation of emergency brake actuation cylinder (not shown) causes clockwise (as depicted) rotation of brake linkage (not shown), thereby actuating the brake (not shown). However, clockwise rotation of the brake linkage (not shown) also causes clockwise rotation of the clutch assembly 806, which can rotate 30° without causing movement of the manual brake lever 802 and manual brake handle 801, which remains in the normal operating position.

Referring now to FIG. 17A, an alternate embodiment of a presently disclosed rotary linkage assembly 900 under normal operating conditions is shown. Assembly 900 can be installed in any section of a rotating brake linkage. Assembly 900 includes a manual brake handle 901 connected to a manual brake lever 902, which is attached to a shaft 905 and a plate 907 of a clutch assembly 906, which further comprises first stop plate 903, first spring 908, second stop plate 904, and second spring 909. In normal operation plate 907 abuts first stop plate 903 and second stop plate 904 and is prevented from clockwise rotation.

Referring now to FIG. 17B, an embodiment of a presently disclosed rotary linkage assembly 900 under normal braking conditions is shown. An operator (not shown) pushes the brake handle 901 and brake lever 902 down causing clockwise (as depicted) rotation of the clutch assembly 906, thereby actuating the brake (not shown).

Referring now to FIG. 17C, an embodiment of the presently disclosed rotary linkage assembly 900 is shown upon actuation of emergency brake actuation cylinder (not shown). Actuation of emergency brake actuation cylinder (not shown) causes clockwise (as depicted) rotation of brake linkage (not shown), thereby actuating the brake (not shown). However, clockwise rotation of the brake linkage (not shown) also causes clockwise rotation of the clutch assembly 906, forcing first spring 908 and second spring 909 to begin compressing from movement between plate 907 and first stop plate 903 and second stop plate 904. However, clutch assembly 906 can rotate up to 30° without fully compressing the first spring 908 and the second spring 909 and causing movement of the manual brake lever 902 and manual brake handle 901, which remain in the normal operating position.

Referring now to FIG. 18A, one embodiment of the presently disclosed scoping linkage assembly 1050 is shown in the normal operating position. This embodiment of a scoping linkage assembly 1050 comprises a first modified connecting rod 1052, one end of which is connected to a first clevis 1051 and the other end of which is connected to one end of an outer tube 1053, a bushing 1054, a shaft or rod 1055, one end of which comprises projections 1055a and 1055b, and the other end of which is connected to one end of a second modified connecting rod 1056, the other end of which is connected to a second clevis 1057. In certain embodiments (not pictured) the first clevis 1051 can be attached directly to one end of the outer tube 1053, and/or the second clevis 1057 can be attached directly to the end of the shaft or rod 1055 opposite projections 1055a and 1055b. FIG. 18B shows the scoping linkage assembly 1050 shown in FIG. 18A in the collapsed position. When a force is applied to the second clevis 1057 along shaft or rod 1055, the shaft or rod 1055 is displaced into the interior of the outer tube 1053, resulting in no movement of the first clevis 1051.

Referring now to FIG. 19A, one embodiment of a presently disclosed scoping linkage braking assembly 1000 is shown under normal operating conditions. Braking assembly 1000 comprises the embodiment of a scoping linkage assembly 1050 shown in FIG. 18A, which replaces the connecting rod 13 of the prior art braking assembly 1 (see FIG. 1). Thus braking assembly 1000 includes a manual brake handle 1001 connected to a manual brake lever 1002, which is mechanically coupled to one end of a first pivot arm 1003, the other end of which is mechanically coupled via a first clevis 1051 to one end of the scoping linkage assembly 1050 shown in FIG. 18A, with the other end of the scoping linkage assembly 1050 mechanically coupled via a second clevis 1057 to one end of a second pivot arm 1010, the other end of which is mechanically coupled to a brake actuator shaft 1011. Also shown in FIG. 19A is an emergency brake actuation cylinder 1004 comprising a cap end 1006, a tube 1005, a head end 1007, and a shaft (or rod) 1008, the distal portion of which is mechanically coupled via a third clevis 1009 to the second pivot arm 1010 between the second clevis 1057 of the scoping linkage assembly 1050 and the brake actuator shaft 1011. Operation of braking assembly 1000 can be performed manually by an operator (not shown) pushing down on the manual brake handle 1001, which pushes down manual brake lever 1002, which pulls first pivot arm 1003, scoping linkage assembly 1050, and second pivot arm 1010 (to the left in FIG. 19A), thereby rotating the brake actuator shaft 1011 and actuating the brake (not shown).

Referring now to FIG. 19B, in certain emergency situations the brake is actuated automatically through activation of the emergency brake actuation cylinder 1004, which causes shaft or rod 1008 to extend, pushing the second pivot arm 1010 (to the left in FIG. 19B), thereby rotating the brake actuator shaft 1011 and actuating the brake (not shown). However, movement of the second pivot arm 1010 also causes the movement (to the left in FIG. 19B) of shaft or rod 1055, which extends into the interior of outer tube 1053 without movement of the first clevis 1051, and thus prevents the force from the extension of the shaft or rod 1008 of the emergency brake actuation cylinder 1004 from being transferred into the manual brake lever 1002 and manual brake handle 1001, which remain in the normal position.

Referring now to FIG. 20A, another embodiment of a presently disclosed scoping linkage assembly 1150 is shown in the normal operating position. This embodiment of a scoping linkage assembly 1150 comprises a first modified connecting rod 1152, one end of which is connected to a first clevis 1151 and the other end of which is connected to one end of an outer tube 1153, a bushing 1154, a shaft or rod 1155, one end of which comprises projections 1155a and 1155b, and the other end of which is connected to one end of a second modified connecting rod 1156, the other end of which is connected to a second clevis 1157. In this embodiment, the outer tube also comprises a shear pin 1158. In certain embodiments (not pictured) the first clevis 1151 can be attached directly to one end of the outer tube 1153, and/or the second clevis 1157 can be attached directly to the end of the shaft or rod 1155 opposite projections 1155a and 1155b. FIG. 20B shows the scoping linkage assembly 1150 shown in FIG. 20A in the collapsed position. When a force is applied to the second clevis 1157 along shaft or rod 1155, the shaft or rod 1155 breaks shear pin 1158 and is displaced into the interior of the outer tube 1153, resulting in no movement of the first clevis 1151.

Referring now to FIG. 21A, another embodiment of a presently disclosed scoping linkage braking assembly 1100 is shown under normal operating conditions. Braking assembly 1100 comprises the embodiment of a scoping linkage assembly 1150 shown in FIG. 20A, which replaces the connecting rod 13 of the prior art braking assembly 1 (see FIG. 1). Thus braking assembly 1100 includes a manual brake handle 1101 connected to a manual brake lever 1102, which is mechanically coupled to one end of a first pivot arm 1103, the other end of which is mechanically coupled via a first clevis 1151 to one end of the scoping linkage assembly 1150 shown in FIG. 20A, with the other end of the scoping linkage assembly 1150 mechanically coupled via a second clevis 1157 to one end of a second pivot arm 1110, the other end of which is mechanically coupled to a brake actuator shaft 1111. Also shown in FIG. 21A is an emergency brake actuation cylinder 1104 comprising a cap end 1106, a tube 1105, a head end 1107, and a shaft (or rod) 1108, the distal portion of which is mechanically coupled via a third clevis 1109 to the second pivot arm 1110 between the second clevis 1157 of the scoping linkage assembly 1150 and the brake actuator shaft 1111. Operation of braking assembly 1100 can be performed manually by an operator (not shown) pushing down on the manual brake handle 1101, which pushes down manual brake lever 1102, which pulls first pivot arm 1103, scoping linkage assembly 1150, and second pivot arm 1110 (to the left in FIG. 21A), thereby rotating the brake actuator shaft 1111 and actuating the brake (not shown).

Referring now to FIG. 21B, in certain emergency situations the brake is actuated automatically through activation of the emergency brake actuation cylinder 1104, which causes shaft or rod 1108 to extend, pushing the second pivot arm 1110 (to the left in FIG. 21B), thereby rotating the brake actuator shaft 1111 and actuating the brake (not shown). However, movement of the second pivot arm 1110 also causes the movement (to the left in FIG. 21B) of shaft or rod 1155, which breaks shear pin 1158 and extends into the interior of outer tube 1153 without movement of the first clevis 1151, and thus prevents the force from the extension of the shaft or rod 1108 of the emergency brake actuation cylinder 1104 from being transferred into the manual brake lever 1102 and manual brake handle 1101, which remain in the normal position.

Referring now to FIG. 22A, another embodiment of a presently disclosed scoping linkage assembly 1250 is shown in the normal operating position. This embodiment of a scoping linkage assembly 1250 comprises a first modified connecting rod 1252, one end of which is connected to a first clevis 1251 and the other end of which is connected to one end of an outer tube 1253, a bushing 1254, a shaft or rod 1255, one end of which comprises projections 1255a and 1255b, and the other end of which is connected to one end of a second modified connecting rod 1256, the other end of which is connected to a second clevis 1257. In this embodiment, the outer tube also comprises a spring 1258. In certain embodiments (not pictured) the first clevis 1251 can be attached directly to one end of the outer tube 1253, and/or the second clevis 1257 can be attached directly to the end of the shaft or rod 1255 opposite projections 1255a and 1255b. FIG. 22B shows the scoping linkage assembly 1250 shown in FIG. 22A in the collapsed position. When a force is applied to the second clevis 1257 along shaft or rod 1255, the shaft or rod 1255 is displaced into the interior of the outer tube 1253 and compresses spring 1158 (not fully compressed), resulting in no movement of the first clevis 1151.

Referring now to FIG. 23A, another embodiment of a presently disclosed scoping linkage braking assembly 1200 is shown under normal operating conditions. Braking assembly 1200 comprises the embodiment of a scoping linkage assembly 1250 shown in FIG. 22A, which replaces the connecting rod 13 of the prior art braking assembly 1 (see FIG. 1). Thus braking assembly 1200 includes a manual brake handle 1201 connected to a manual brake lever 1202, which is mechanically coupled to one end of a first pivot arm 1203, the other end of which is mechanically coupled via a first clevis 1251 to one end of the scoping linkage assembly 1250 shown in FIG. 22A, with the other end of the scoping linkage assembly 1250 mechanically coupled via a second clevis 1257 to one end of a second pivot arm 1210, the other end of which is mechanically coupled to a brake actuator shaft 1211. Also shown in FIG. 23A is an emergency brake actuation cylinder 1204 comprising a cap end 1206, a tube 1205, a head end 1207, and a shaft (or rod) 1208, the distal portion of which is mechanically coupled via a third clevis 1209 to the second pivot arm 1210 between the second clevis 1257 of the scoping linkage assembly 1250 and the brake actuator shaft 1211. Operation of braking assembly 1200 can be performed manually by an operator (not shown) pushing down on the manual brake handle 1201, which pushes down manual brake lever 1202, which pulls first pivot arm 1203, scoping linkage assembly 1250, and second pivot arm 1210 (to the left in FIG. 23A), thereby rotating the brake actuator shaft 1211 and actuating the brake (not shown).

Referring now to FIG. 23B, in certain emergency situations the brake is actuated automatically through activation of the emergency brake actuation cylinder 1204, which causes shaft or rod 1208 to extend, pushing the second pivot arm 1210 (to the left in FIG. 23B), thereby rotating the brake actuator shaft 1211 and actuating the brake (not shown). However, movement of the second pivot arm 1210 also causes the movement (to the left in FIG. 23B) of shaft or rod 1255, which extends into the interior of outer tube 1153 and compresses spring 1258 (Not fully compressed), without movement of the first clevis 1251, and thus prevents the force from the extension of the shaft or rod 1208 of the emergency brake actuation cylinder 1204 from being transferred into the manual brake lever 1202 and manual brake handle 1201, which remain in the normal position.

Referring now to FIG. 24A, another embodiment of a presently disclosed scoping linkage assembly 1350 is shown in the normal operating position. This embodiment of a scoping linkage assembly 1350 comprises a first modified connecting rod 1352, one end of which is connected to a first clevis 1351 and the other end of which is connected to one end of an outer tube 1353, a bushing 1354, a shaft or rod 1355, one end of which comprises projections 1355a and 1355b, and the other end of which is connected to one end of a second modified connecting rod 1356, the other end of which is connected to a second clevis 1357. In this embodiment, the outer tube also comprises a shear pin 1358 and a spring 1359. In certain embodiments (not pictured) the first clevis 1351 can be attached directly to one end of the outer tube 1353, and/or the second clevis 1357 can be attached directly to the end of the shaft or rod 1355 opposite projections 1355a and 1355b. FIG. 24B shows the scoping linkage assembly 1350 shown in FIG. 24A in the collapsed position. When a force is applied to the second clevis 1357 along shaft or rod 1355, the shaft or rod 1355 breaks the shear pin 1358 and is displaced into the interior of the outer tube 1353 and compresses spring 1359 (not fully compressed), resulting in no movement of the first clevis 1351.

Referring now to FIG. 25A, another embodiment of a presently disclosed scoping linkage braking assembly 1300 is shown under normal operating conditions. Braking assembly 1300 comprises the embodiment of a scoping linkage assembly 1350 shown in FIG. 24A, which replaces the connecting rod 13 of the prior art braking assembly 1 (see FIG. 1). Thus braking assembly 1300 includes a manual brake handle 1301 connected to a manual brake lever 1302, which is mechanically coupled to one end of a first pivot arm 1303, the other end of which is mechanically coupled via a first clevis 1351 to one end of the scoping linkage assembly 1350 shown in FIG. 24A, with the other end of the scoping linkage assembly 1350 mechanically coupled via a second clevis 1357 to one end of a second pivot arm 1310, the other end of which is mechanically coupled to a brake actuator shaft 1311. Also shown in FIG. 25A is an emergency brake actuation cylinder 1304 comprising a cap end 1306, a tube 1305, a head end 1307, and a shaft (or rod) 1308, the distal portion of which is mechanically coupled via a third clevis 1309 to the second pivot arm 1310 between the second clevis 1357 of the scoping linkage assembly 1350 and the brake actuator shaft 1311. Operation of braking assembly 1300 can be performed manually by an operator (not shown) pushing down on the manual brake handle 1301, which pushes down manual brake lever 1302, which pulls first pivot arm 1303, scoping linkage assembly 1350, and second pivot arm 1310 (to the left in FIG. 25A), thereby rotating the brake actuator shaft 1311 and actuating the brake (not shown).

Referring now to FIG. 25B, in certain emergency situations the brake is actuated automatically through activation of the emergency brake actuation cylinder 1304, which causes shaft or rod 1308 to extend, pushing the second pivot arm 1310 (to the left in FIG. 25B), thereby rotating the brake actuator shaft 1311 and actuating the brake (not shown). However, movement of the second pivot arm 1310 also causes the movement (to the left in FIG. 25B) of shaft or rod 1355, which breaks shear pin 1358 and extends into the interior of outer tube 1353 and compresses spring 1358 (not fully compressed), without movement of the first clevis 1351, and thus prevents the force from the extension of the shaft or rod 1308 of the emergency brake actuation cylinder 1304 from being transferred into the manual brake lever 1302 and manual brake handle 1301, which remain in the normal position.

Figure 26:
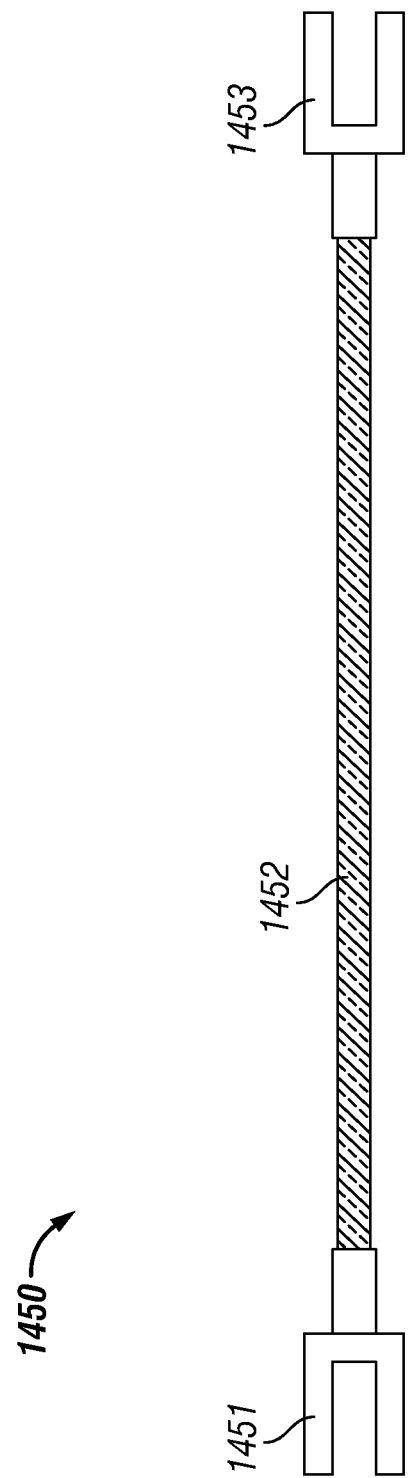
FIG. 26. An embodiment of a cable linkage assembly.

Referring now to FIG. 26, an embodiment of a presently disclosed cable linkage assembly 1450 is shown in the normal operating position. This embodiment of a cable linkage assembly 1450 comprises a first clevis 1451 connected to one end of a cable 1452, the other end of which is connected to a second clevis 1453.

Referring now to FIG. 27A, an embodiment of a presently disclosed cable linkage braking assembly 1400 is shown under normal operating conditions. Braking assembly 1400 comprises the embodiment of a cable linkage assembly 1450 shown in FIG. 26, which replaces the connecting rod 13 of the prior art braking assembly 1 (see FIG. 1). Thus braking assembly 1400 includes a manual brake handle 1401 connected to a manual brake lever 1402, which is mechanically coupled to one end of a first pivot arm 1403, the other end of which is mechanically coupled via a first clevis 1451 to one end of the cable linkage assembly 1450 shown in FIG. 26, with the other end of the scoping linkage assembly 1450 mechanically coupled via a second clevis 1453 to one end of a second pivot arm 1410, the other end of which is mechanically coupled to a brake actuator shaft 1411. Also shown in FIG. 27A is an emergency brake actuation cylinder 1404 comprising a cap end 1406, a tube 1405, a head end 1407, and a shaft (or rod) 1408, the distal portion of which is mechanically coupled via a third clevis 1409 to the second pivot arm 1410 between the second clevis 1453 of the scoping linkage assembly 1450 and the brake actuator shaft 1411. Operation of braking assembly 1400 can be performed manually by an operator (not shown) pushing down on the manual brake handle 1401, which pushes down manual brake lever 1402, which pulls first pivot arm 1403, cable linkage assembly 1450, and second pivot arm 1410 (to the left in FIG. 27A), thereby rotating the brake actuator shaft 1411 and actuating the brake (not shown).

Referring now to FIG. 27B, in certain emergency situations the brake is actuated automatically through activation of the emergency brake actuation cylinder 1404, which causes shaft or rod 1408 to extend, pushing the second pivot arm 1410 (to the left in FIG. 27B), thereby rotating the brake actuator shaft 1411 and actuating the brake (not shown). However, movement of the second pivot arm 1410 also causes the movement (to the left in FIG. 27B) of second clevis 1453, which causes cable 1452 to sag without movement of the first clevis 1451, and thus prevents the force from the extension of the shaft or rod 1408 of the emergency brake actuation cylinder 1404 from being transferred into the manual brake lever 1402 and manual brake handle 1401, which remain in the normal position.

The disclosed fluid cylinder linkage braking assembly is adaptable to any drilling rig or mobile well servicing unit manual brake linkage, and can also be integrated into stand alone brake handle assemblies. The disclosed fluid cylinder linkage braking assembly can be retrofitted to existing drilling rigs or mobile well servicing units, or integrated into new drilling rig or mobile well servicing designs. Even in situations where the emergency brake actuation cylinder is activated but the fluid piloted control valve fails to vent properly, the fluid cylinder acts as a fluid spring to cushion the impact from the emergency brake actuation cylinder. The components of the disclosed fluid cylinder linkage braking assembly can be constructed of steel, aluminum, other metallic and non-metallic materials, or combinations thereof, known to those of ordinary skill in the art. The disclosed fluid cylinder linkage braking assembly and control system can comprise different fluids depending upon the particular application, including, but not limited to, air, hydraulic fluid, and various gases, which are known to those of ordinary skill in the art.

The following example is included to demonstrate preferred embodiments of the invention. It should be appreciated by those of skill in the art that the techniques disclosed in the example which follows represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. The present invention is not to be limited in scope by the specific embodiments described herein, which are intended as single illustrations of individual aspects of the invention, and functionally equivalent methods and components are within the scope of the invention. Indeed, various modifications of the invention, in addition to those shown and described herein, will become apparent to those skilled in the art from the foregoing description. Such modifications are intended to fall within the scope of the appended claims.

EXAMPLE 1

One embodiment of the disclosed fluid cylinder linkage braking assembly, an air cylinder linkage braking assembly, was installed on a standard mobile drilling rig and tested. Upon activation of the emergency brake actuation cylinder, the air cylinder linkage braking assembly transmitted nearly zero movement or force into the manual brake used by the operator. Tests were conducted by two operators and were conducted multiple times while raising and lowering the traveling block, allowing the emergency brake system to actuate the emergency brake cylinder while the operator held the manual brake handle. Additionally, manual brake operation when the emergency brake actuation cylinder was not activated (normal operating mode) utilizing the air cylinder linkage braking assembly was not discernibly different from the manual brake operation in normal operating mode without the air cylinder linkage braking assembly.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed:

1. A fluid cylinder linkage assembly for a rig brake system, comprising:
   a) a rod end adaptor having a first end and a second end;
   b) a fluid cylinder comprising a head having a first vent, a tube having a first end and a second end, the first end of the tube attached to the head, a cap having a second vent, the second end of the tube attached to the cap, a piston disposed within said tube, and a rod having a first end and a second end, the first end of the rod connected to the piston, and the second end of the rod connected to the rod end adaptor, wherein at least a portion of the first end of the rod is disposed within the tube;
   c) a cap end adaptor having a first end and a second end, the first end of the cap end adaptor connected to the cap of the fluid cylinder; and
   d) a fluid control valve connected to the cap or the head of the fluid cylinder.

2. The fluid cylinder linkage assembly of claim 1, wherein the fluid control valve is connected to the second vent of the cap of the fluid cylinder.

3. The fluid cylinder linkage assembly of claim 1, wherein the fluid control valve is connected to the first vent of the head of the fluid cylinder.

4. The fluid cylinder linkage assembly of claim 1, wherein the fluid cylinder and the fluid control valve utilize air, hydraulic fluid, hydraulic oil, water, or nitrogen gas.

5. The fluid cylinder linkage assembly of claim 4, wherein the fluid cylinder and the fluid control valve utilize air.

6. The fluid cylinder linkage assembly of claim 1, further comprising a first connecting rod having a first end and a second end, wherein the first end of the first connecting rod is connected to the second end of the cap end adaptor, or the second end of the first connecting rod is connected to the first end of the rod end adaptor.

7. The fluid cylinder linkage assembly of claim 1, further comprising a first connecting rod having a first end and a second end, wherein the second end of the first connecting rod is connected to the first end of the rod end adaptor, and a second connecting rod having a first end and a second end, wherein the first end of the second connecting rod is connected to the second end of the cap end adaptor.

8. A fluid cylinder linkage braking assembly for a rig, comprising:
   a) a brake lever;
   b) a fluid cylinder linkage assembly; comprising:

i) a rod end adaptor having a first end and a second end;

ii) a fluid cylinder comprising a head having a first vent, a tube having a first end and a second end, the first end of the tube attached to the head, a cap having a second vent, the second end of the tube attached to the cap, a piston disposed within said tube, and a rod having a first end and a second end, the first end of the rod connected to the piston, and the second end of the rod connected to the rod end adaptor, wherein at least a portion of the first end of the rod is disposed within the tube;

iii) a cap end adaptor having a first end and a second end, the first end of the cap end adaptor connected to the cap of the cylinder; and vi) a fluid control valve connected to the cap or the head of the fluid cylinder;

c) an emergency brake actuation cylinder comprising a body and a rod having a distal end, the distal end of the rod of the emergency brake actuation cylinder mechanically linked to the second end of the cap end adaptor; and d) a brake actuation shaft mechanically linked to the emergency brake and the second end of the cap end adaptor.

9. The fluid cylinder linkage braking assembly of claim 8, wherein the fluid control valve is connected to the second vent of the cap of the fluid cylinder.

10. The fluid cylinder linkage braking assembly of claim 8, wherein the fluid control valve is connected to the first vent of the head of the fluid cylinder.

11. The fluid cylinder linkage braking assembly of claim 8, wherein the fluid cylinder and the fluid control valve utilize air, hydraulic fluid, hydraulic oil, water, or nitrogen gas.

12. The fluid cylinder linkage braking assembly of claim 11, wherein the fluid cylinder and the fluid control valve utilize air.

13. The fluid cylinder linkage braking assembly of claim 8, further comprising a brake handle coupled to the brake lever.

14. The fluid cylinder linkage braking assembly of claim 8, further comprising a first connecting rod having a first end and a second end, wherein the first end of the first connecting rod is connected to the second end of the cap end adaptor, or the second end of the first connecting rod is connected to the first end of the rod end adaptor.

15. The fluid cylinder linkage braking assembly of claim 8, further comprising a first connecting rod having a first end and a second end, wherein the second end of the first connecting rod is connected to the first end of the rod end adaptor, and a second connecting rod having a first end and a second end, wherein the first end of the second connecting rod is connected to the second end of the cap end adaptor.

16. A fluid cylinder linkage assembly for a rig brake system, comprising:

a) a rod end adaptor having a first end and a second end;

b) a fluid cylinder comprising a head having a first vent, a tube having a first end and a second end, the first end of the tube attached to the head, a cap having a second vent, the second end of the tube attached to the cap, a piston disposed within said tube, and a rod having a first end and a second end, the first end of the rod connected to the piston, and the second end of the rod connected to the rod end adaptor, wherein at least a portion of the first end of the rod is disposed within the tube;

c) a cap end adaptor having a first end and a second end, the first end of the cap end adaptor connected to the cap of the fluid cylinder; and d) a fluid control valve connected to the cap and the head of the fluid cylinder.

17. The fluid cylinder linkage assembly of claim 16, wherein the fluid control valve is connected to the first vent of the head of the fluid cylinder and the second vent of the cap of the fluid cylinder.

18. The fluid cylinder linkage assembly of claim 16, wherein the fluid cylinder and the fluid control valve utilize air, hydraulic fluid, hydraulic oil, water, or nitrogen gas.

19. The fluid cylinder linkage assembly of claim 16, further comprising a first connecting rod having a first end and a second end, wherein the first end of the first connecting rod is connected to the second end of the cap end adaptor, or the second end of the first connecting rod is connected to the first end of the rod end adaptor.

20. The fluid cylinder linkage assembly of claim 16, further comprising a first connecting rod having a first end and a second end, wherein the second end of the first connecting rod is connected to the first end of the rod end adaptor, and a second connecting rod having a first end and a second end, wherein the first end of the second connecting rod is connected to the second end of the cap end adaptor.

* * * * *